United States Patent
Osato et al.

(10) Patent No.: US 8,169,948 B2
(45) Date of Patent: May 1, 2012

(54) CODE SYNCHRONIZATION CIRCUIT, DELAY TIME MEASUREMENT DEVICE, CONTROL METHOD, CONTROL PROGRAM, AND COMPUTER-READABLE STORAGE MEDIUM

(75) Inventors: Mayumi Osato, Ikoma (JP); Takao Hara, Ikoma (JP); Kiyotake Ando, Minato-ku (JP)

(73) Assignees: National University Corporation Nara Institute of Science and Technology, Nara (JP); Sky Perfect Jsat Corporation, Tokyo (JP)

( * ) Notice: Subject to any disclaimer, the term of this patent is extended or adjusted under 35 U.S.C. 154(b) by 449 days.

(21) Appl. No.: 12/514,726
(22) PCT Filed: Nov. 16, 2007
(86) PCT No.: PCT/JP2007/072321
§ 371 (c)(1),
(2), (4) Date: May 13, 2009
(87) PCT Pub. No.: WO2008/062736
PCT Pub. Date: May 29, 2008

(65) Prior Publication Data
US 2010/0316038 A1 Dec. 16, 2010

(30) Foreign Application Priority Data
Nov. 24, 2006 (JP) ................................. 2006-317583

(51) Int. Cl.
H04B 7/212 (2006.01)
(52) U.S. Cl. ...................................................... 370/324
(58) Field of Classification Search .................. None
See application file for complete search history.

(56) References Cited

U.S. PATENT DOCUMENTS
5,832,379 A * 11/1998 Mallinckrodt ................ 455/427
(Continued)

FOREIGN PATENT DOCUMENTS
JP 2002-185364 6/2002
(Continued)

OTHER PUBLICATIONS

Takao Hara, Mamoru Fukui, Heiichi Yamamoto, 'Fast and Stable Acquisition by Utilizing Multi-Component Code in the Very Low C/N Conditions', IEICE Trans. Commun. (Japanese Edition) vol. J87-B No. 1, Jan. 1, 2004, pp. 19-35; not in English.

(Continued)

Primary Examiner — Anh-Vu Ly
(74) Attorney, Agent, or Firm — Nixon & Vanderhye PC

(57) ABSTRACT

A code synchronization circuit for a delay time measurement device used in a low C/N environment is provided. The code synchronization circuit is capable of high precision timing phase measurement and stable operation against variations in the reception level. For these purposes, the code synchronization circuit includes: a numeric control frequency variable oscillation section (5) for generating a clock signal with a variable frequency; a 2-divider (23) for dividing the clock signal by 2 to generate a component code signal (X); a T/2 delay device (4) for outputting a delayed component code signal (x) lagging in phase behind the component code signal (X) by half a bit; and a second correlator (3B) for outputting a second correlation value indicating similarity between the delayed component code signal (x) and the carrier signal, where the numeric control frequency variable oscillation section (5) controls the frequency of the clock signal according to the second correlation value so that the carrier signal and the clock signal are in sync.

12 Claims, 21 Drawing Sheets

U.S. PATENT DOCUMENTS

| | | | | |
|---|---|---|---|---|
| 5,995,832 A | * | 11/1999 | Mallinckrodt | 455/427 |
| 6,028,883 A | * | 2/2000 | Tiemann et al. | 370/320 |
| 6,215,780 B1 | * | 4/2001 | Peters et al. | 370/342 |
| 2004/0258138 A1 | | 12/2004 | Oishi et al. | |

FOREIGN PATENT DOCUMENTS

JP        2003-224540        8/2003

OTHER PUBLICATIONS

M. Ichikawa, T. Hara, M. Okada, H. Yamamoto and K. Andou "Fast and Accurate Canceller on Carrier Super-positioning For VSAT Frequency Re-use" IEEE-WCNC 2005, New Orleans, Mar. 2005, p. 1-p. 6; in English language.

H. Kobashi, M Osato, T. Hara, M. Okada and H. Yamamoto, "Signal Cancellation for Satellite Frequency Reuse by Super-positioning multi-level Modulation," IEEE-ISCC 2006, Jun. 2006, p. 1-p. 15; in English language.

Noriaki Ishida, "Common-band Satellite Communication System", IEIEC Transactions vol. J82-B, No. 8, pp. 1531-1537 Aug. 1999; English translation provided.

M. Osato, H. Kobashi, T. Hara, M. Okada, and H. Yamamoto, "Simplified Canceller for Multi-level Modulation Super-Positioning for Frequency Reuse Satellite Communications," ITC 2006, May 2006, p. 1-p. 4; in English language.

S.W. Golomb and M.F. Easterling, "Digital Communications with Space Applications," Prentice-Hall, 1964, p. 85-p. 105; in English language.

International Search Report for PCT/JP2007/072321, mailed Dec. 18, 2007.

Hara, Takao et al., "Fast and Stable Acquisition by Utilization Multi-Component Code Under Very Low C/N Conditions: Application to Acquisition in TDMA Satellite Communication Systems", Electronics and Communications in Japan, Part 1, vol. 88, No. 5, (2005), pp. 19-35.

\* cited by examiner

FIG. 5

| Z | Y | CL/2 | W / cl/2 | 0 | 1 |
|---|---|------|----------|---|---|
| 0 | 0 | 0 | 0 | 0 | 1 |
| 1 | 0 | 0 | 0 | 0 | 1 |
| 0 | 1 | 0 | 0 | 0 | 1 |
| 1 | 1 | 0 | 1 | 1 | 0 |
| 0 | 0 | 1 | 1 | 1 | 0 |
| 1 | 0 | 1 | 1 | 1 | 0 |
| 0 | 1 | 1 | 1 | 1 | 0 |
| 1 | 1 | 1 | 0 | 0 | 1 |

(Agreement: 0, Disagreement: 1)

Correlation $C_{inphase} = \frac{6-2}{8} = 0.5$     Inverse Correlation $C_{inverse} = \frac{2-6}{8} = -0.5$ F I G. 8
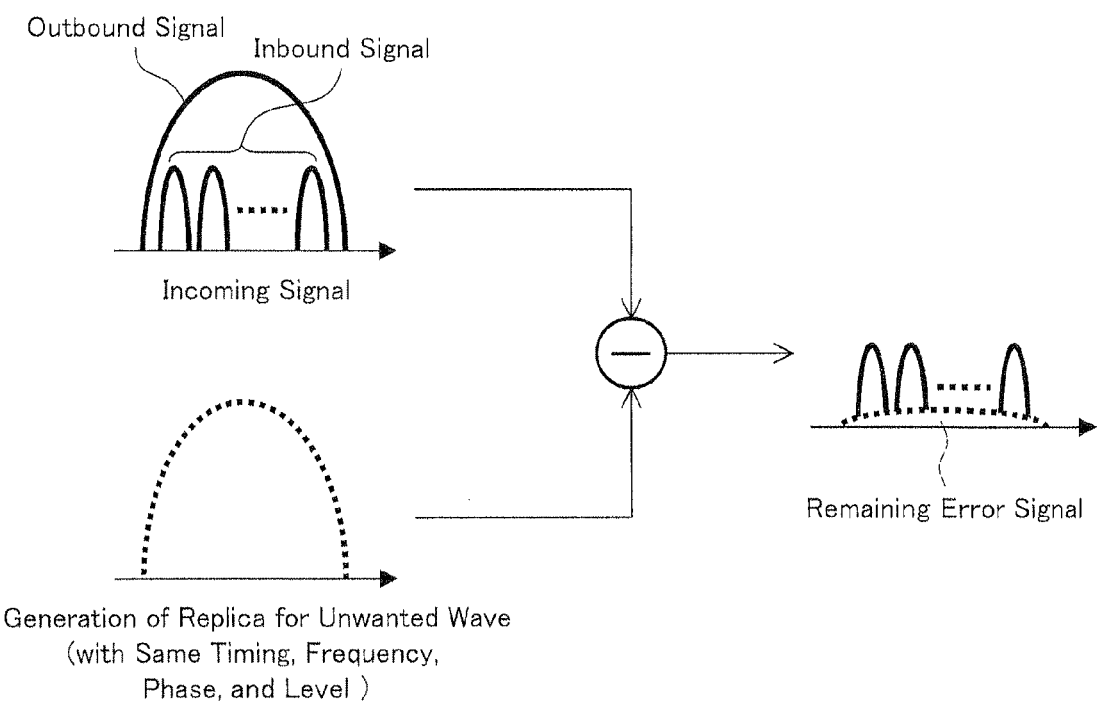
PRIOR ART F I G. 9
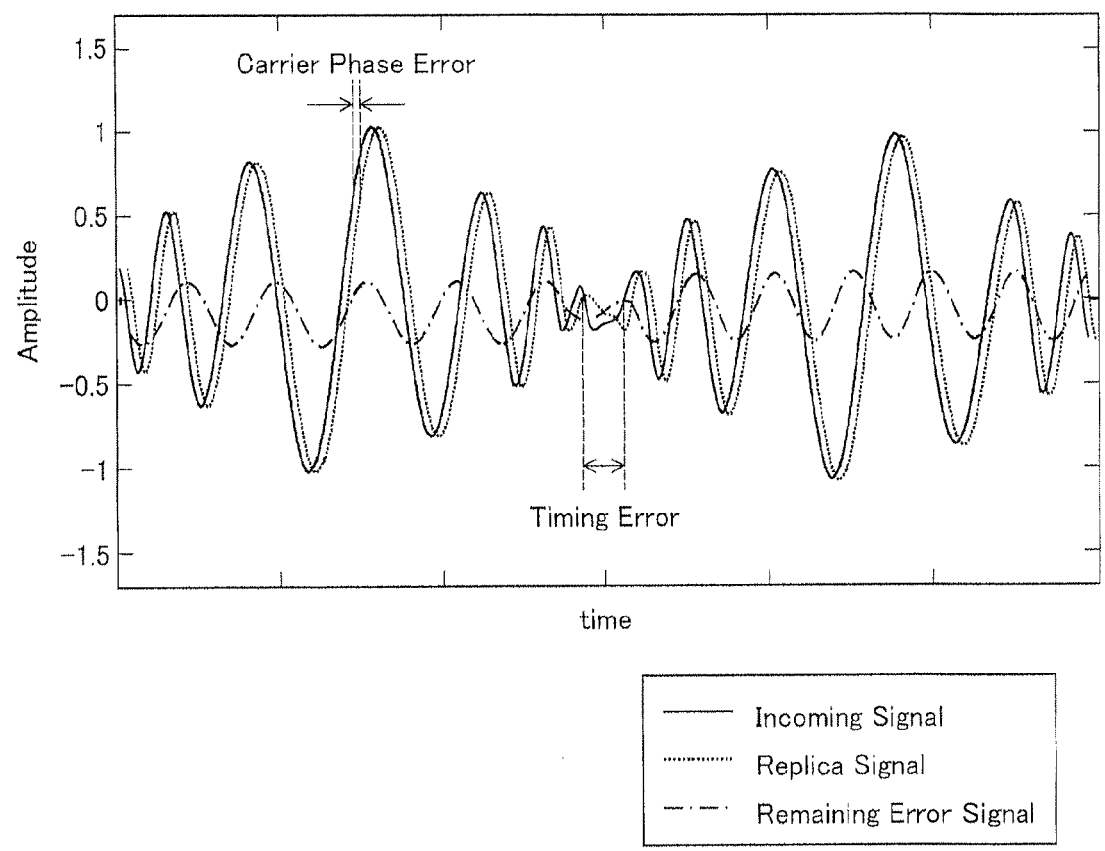
PRIOR ART F I G. 1 0
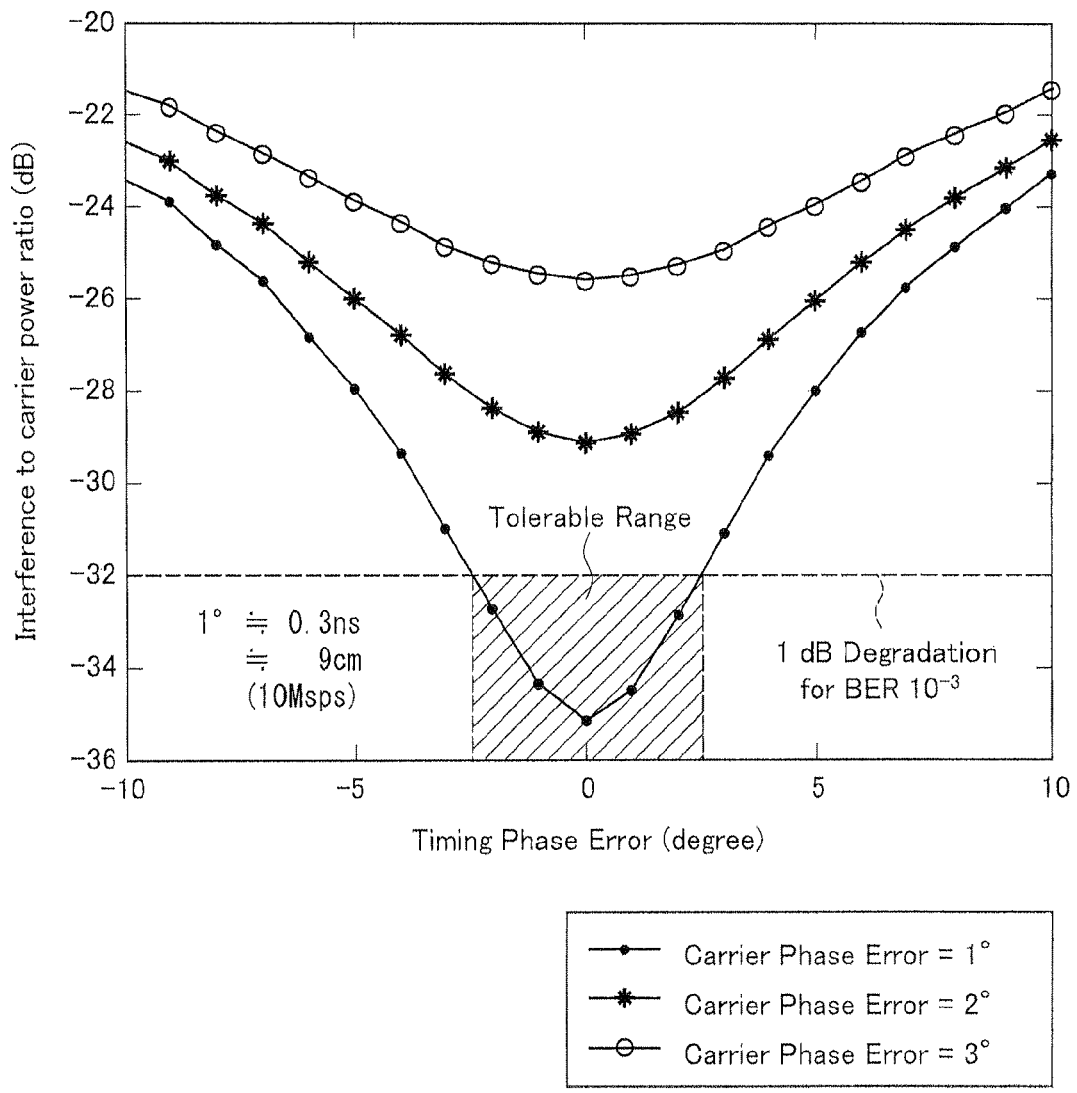
PRIOR ART F I G. 1 1
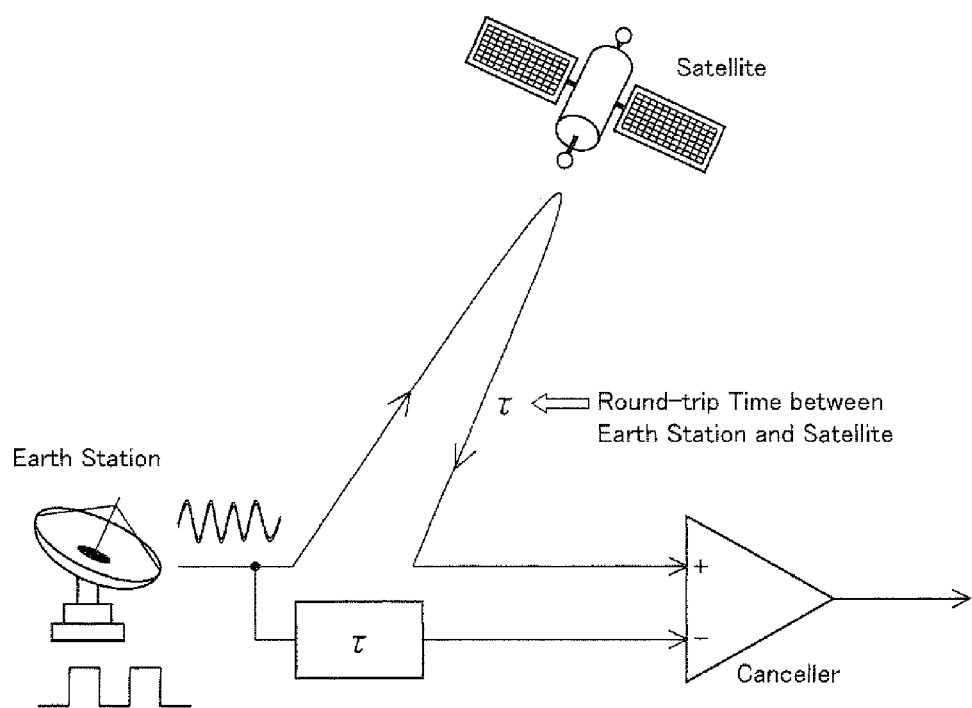

FIG. 13

| Multi-component Code Generation Formula | $W = CL/2 \oplus (Y \cdot Z)$ |

Example

| X(CL/2) | 0 | 1 | 0 | 1 | 0 | 1 | 0 | 1 | 0 | 1 | 0 | 1 | 0 | 1 | 0 | 1 | 0 | 1 | 0 | 1 | .... |
| --- | --- | --- | --- | --- | --- | --- | --- | --- | --- | --- | --- | --- | --- | --- | --- | --- | --- | --- | --- | --- | --- |
| Y | 0 | 1 | 1 | 1 | 0 | 1 | 1 | 0 | 1 | 1 | 1 | 0 | 1 | 1 | 0 | 1 | 1 | 1 | 0 | 1 | .... |
| Z | 1 | 0 | 1 | 0 | 0 | 0 | 1 | 0 | 1 | 1 | 1 | 1 | 0 | 1 | 0 | 0 | 0 | 1 | 0 | 1 | .... |
| ↓ | ↓ | ↓ | ↓ | ↓ | ↓ | ↓ | ↓ | ↓ | ↓ | ↓ | ↓ | ↓ | ↓ | ↓ | ↓ | ↓ | ↓ | ↓ | ↓ | ↓ | |
| W | 0 | 1 | 1 | 1 | 0 | 1 | 1 | 1 | 1 | 0 | 1 | 1 | 0 | 0 | 0 | 1 | 0 | 0 | 0 | 0 | .... |

FIG. 14

$W = X \oplus (Y \cdot Z)$
$w = x \oplus (y \cdot z)$

| | | | z | 0 | 1 | 0 | 1 | 0 | 1 | 0 | 1 |
|---|---|---|---|---|---|---|---|---|---|---|---|
| | | | y | 0 | 0 | 1 | 1 | 0 | 0 | 1 | 1 |
| | | | x | 0 | 0 | 0 | 0 | 1 | 1 | 1 | 1 |
| Z | Y | X | W/w | 0 | 0 | 0 | 1 | 1 | 1 | 1 | 0 |
| 0 | 0 | 0 | 0 | 0 | 0 | 0 | 1 | 1 | 1 | 1 | 0 |
| 1 | 0 | 0 | 0 | 0 | 0 | 0 | 1 | 1 | 1 | 1 | 0 |
| 0 | 1 | 0 | 0 | 0 | 0 | 0 | 1 | 1 | 1 | 1 | 0 |
| 1 | 1 | 0 | 1 | 1 | 1 | 1 | 0 | 0 | 0 | 0 | 1 |
| 0 | 0 | 1 | 1 | 1 | 1 | 1 | 0 | 0 | 0 | 0 | 1 |
| 1 | 0 | 1 | 1 | 1 | 1 | 1 | 0 | 0 | 0 | 0 | 1 |
| 0 | 1 | 1 | 1 | 1 | 1 | 1 | 0 | 0 | 0 | 0 | 1 |
| 1 | 1 | 1 | 0 | 0 | 0 | 1 | 1 | 1 | 1 | 1 | 0 |

(Agreement: 0, Disagreement: 1)

··· X Agreed

··· X and Y Agreed

◯ ··· All Agreed

FIG. 16
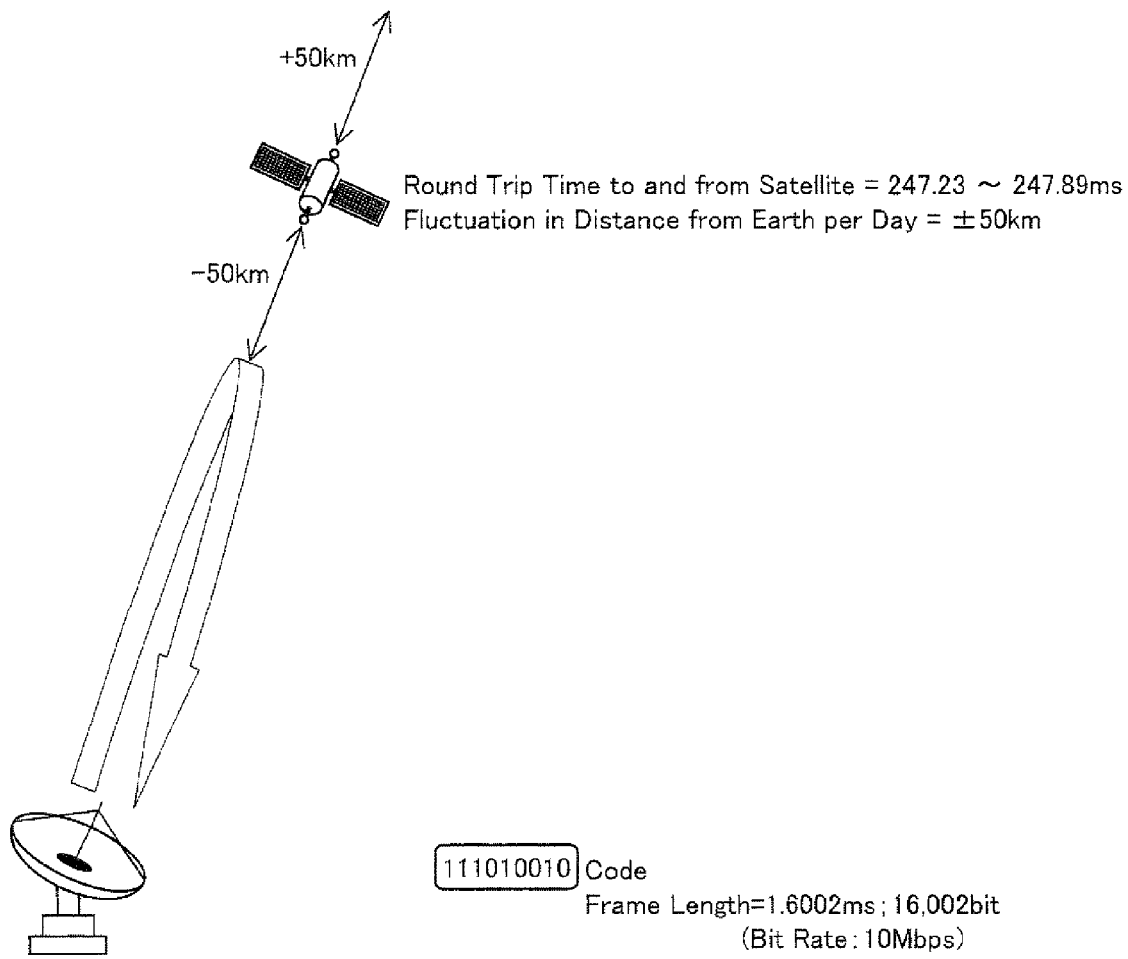
+50km
Round Trip Time to and from Satellite = 247.23 ~ 247.89ms
Fluctuation in Distance from Earth per Day = ±50km
−50km
111010010 Code
Frame Length=1.6002ms; 16,002bit
(Bit Rate: 10Mbps)
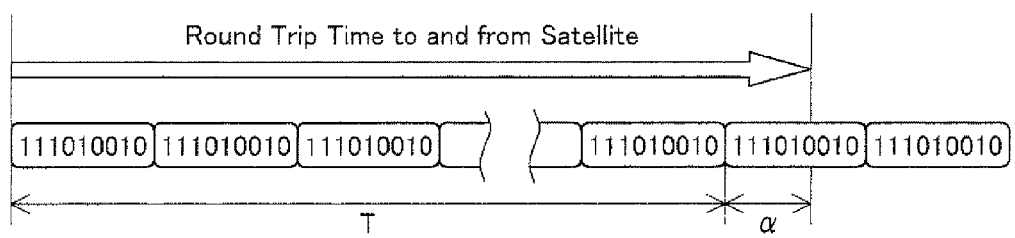
Fixed Delay Time : T = 154 × 1.6002ms
Round Trip Time to and from Satellite : $\tau = T + \alpha$ F I G. 1 8
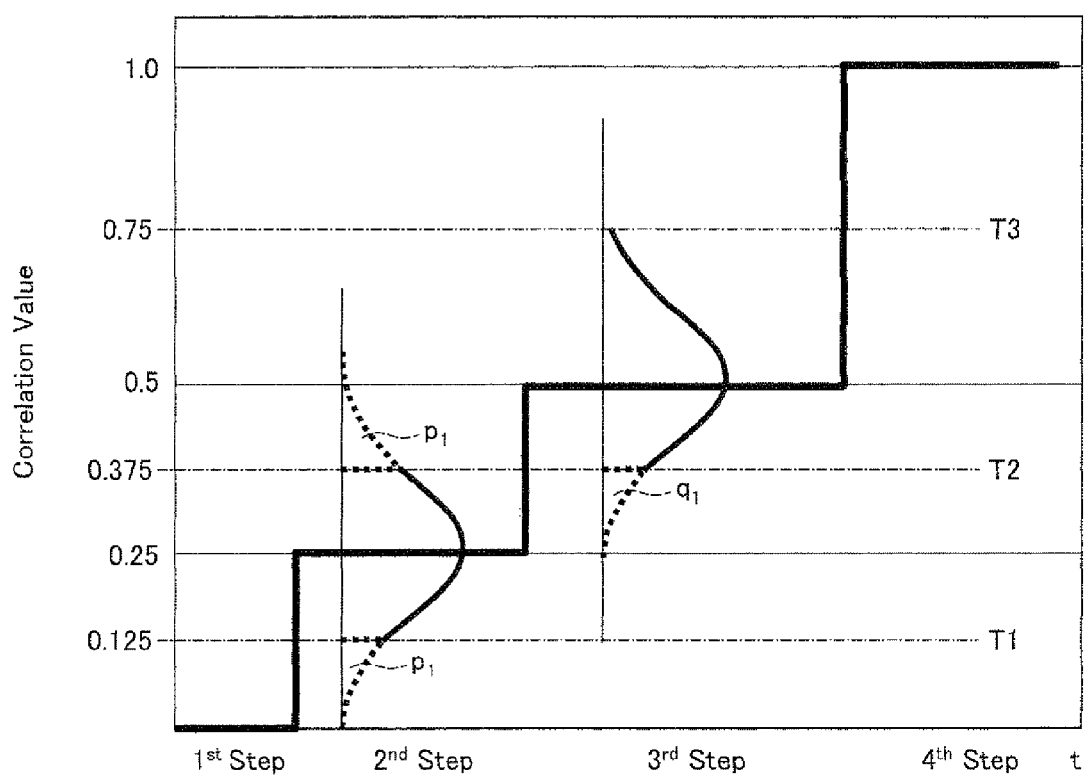

FIG. 21

| Integration Bit No. in Correlation [bit] | Improved S/N [dB] | $S/N_{out}$ [dB] | Average No. of Shifts Q | sec/shift [s] | Average Sync Time [s] |
|---|---|---|---|---|---|
| $10^6$ | 60 | +35 | 96 | 0.1 | 9.6 |
| $10^5$ | 50 | +25 | 99 | 0.01 | 0.99 |
| $10^4$ | 40 | +15 | 1280 | 0.001 | 1.28 |
| (Bit rate:10Mbps , $S/N_{IN}$ :-25dB , length of each sequence:L=2, M=63, N=127) | | | | | |

US 8,169,948 B2

CODE SYNCHRONIZATION CIRCUIT, DELAY TIME MEASUREMENT DEVICE, CONTROL METHOD, CONTROL PROGRAM, AND COMPUTER-READABLE STORAGE MEDIUM

This application is the U.S. national phase of International Application No. PCT/JP2007/072321 filed 16 Nov. 2007, which designated the U.S. and claims priority to Japan Application No. 2006-317583 filed 24 Nov. 2006, the entire contents of each of which are hereby incorporated by reference.

TECHNICAL FIELD

The present invention relates primarily to code synchronization circuits and delay time measurement devices, and in particular to code synchronization circuits and delay time measurement devices using multi-component code.

BACKGROUND ART

Geostationary satellites are currently in circular orbits on the plane of the earth's equator. Satellite communications using the satellites are very popular. Imagine a sector of a circle with the arc matching a part of the circular orbit of a geostationary satellite and the center matching a location on the earth. The satellite is accessible from the ground location if the satellite is in the part of the orbit (arc) whose center angle is about from 50° to 60°. In addition, adjacent geostationary satellites need to be separated by a distance of about 2° or more in terms of the center angle to avoid interference.

To accommodate a greater satellite communications traffic in the tight satellite orbit space, technological development for reuse of frequency has never been more important than now. One of effective techniques for reuse of frequency in satellite communications is frequency superimposition.

Frequency superimposition in a VSAT (very small-aperture terminal) system will be described in reference to (a) of FIG. 7 to (d) of FIG. 7. The communications system in (a) of FIG. 7 and (b) of FIG. 7 is a VSAT system called P-MP or star network. Satellite communications are performed in the communications system between a single hub station (base station) and multiple very small-aperture terminals (user stations) via a geostationary satellite.

Referring to (a) of FIG. 7 depicting transmissions, generally, the hub station transmits carrier signals with a wide frequency band and the very small-aperture terminals transmit carrier signals with a narrow frequency band. The carrier signal with a wide frequency band transmitted from the hub station is termed outbound signal. The carrier signals with a narrow frequency band transmitted from the very small-aperture terminals to the hub station are termed inbound signals.

An outbound signal generally includes high speed TDM (high speed time division multiplex) channels. Inbound signals in many cases include FDMA (frequency division multiple access) multiplex, narrow bandwidth channels from each very small-aperture terminal or each group of very small-aperture terminals.

The upside-down figure-U symbols in (a) and (b) of FIG. 7 are representations of the spectra of these carrier signals. The greater the size of the symbol is, the wider the frequency band of the carrier signal is. Referring to (b) of FIG. 7 illustrating reception, the hub station and the very small-aperture terminals each receive all of the carrier signals transmitted from that station/terminal and those transmitted from the other stations/terminals. For example, the hub station receives all of the carrier signals (outbound signal) transmitted from the station itself and carrier signals (inbound signals) transmitted from the very small-aperture terminals.

Next will be described the relationships of these carrier signals in frequency bands of the satellite communications channels in reference to (c) and (d) of FIG. 7. (c) of FIG. 7 depicts a frequency relationship of the carrier signals in a conventional communications method. (d) of FIG. 7 depicts a frequency relationship of the carrier signals in frequency superimposition.

In the conventional communications system, the carrier signals for an outbound signal and inbound signals are positioned side by side in separated frequency bands to avoid interference as shown in (c) of FIG. 7. On the other hand, in frequency superimposition, the inbound signals are positioned side by side in the same frequency band as the outbound signal as shown in (d) of FIG. 7. The frequency superimposition theoretically doubles efficiency in the use of the frequency bands of the satellite communications channels.

However, for example, the hub station needs the inbound signals, but not the outbound signal transmitted from itself, because the outbound signal and the inbound signals are superimposed in the same bandwidth in the frequency superimposition.

Therefore, for the hub station to obtain necessary inbound signals, the hub station needs to cancel the unwanted outbound signal to avoid interference between the frequency superimposed outbound signal and inbound signals. A device cancelling such unwanted signals from incoming signals is called a canceller.

In P-MP systems, the power density of the outbound signal transmitted from the hub station to the very small-aperture terminals is greater than the power density of the inbound signals transmitted from the very small-aperture terminals to the hub station due to difference in receiving capability between the hub station and the very small-aperture terminals. The hub station therefore needs a canceller, whereas the very small-aperture terminals do not need on.

The hub station needs to generate a replica of the signal sent from the satellite and subtract the replica to cancel the unwanted carrier in frequency superimposition. There are several ways to generate the replica signal. A first method is to measure the time it takes for the signal to make a round trip from the hub station to the communications satellite and back ("delay time") to acquire synchronization of the replica signal and the incoming signal. See non-patent literatures 1 and 2.

A second method is to estimate the delay time from real time information on the orbital position of the communications satellite in space. See non-patent literature 3. A third method is to demodulate incoming waves for the unwanted carrier. See (non-patent literature 4.

The first method requires accurate and stable delay time measurement, which would be a problem.

The second method will have trouble in determining the real time orbital position of the communications satellite.

The third method also has a problem that symbol errors could occur in the demodulation for the unwanted carrier. Non-patent literature 4, in relation to the third method of generating a replica signal for cancelling the unwanted carrier, discloses utilization of a difference in power density between the outbound signal and the inbound signals. The method requires no measurement of delay time and is effective when the difference in power density between the wanted carriers and the unwanted carrier is sufficiently large.

In contrast, when the difference in power density between the wanted carriers and the unwanted carrier is not sufficiently large, the measuring of the delay time based on the round trip time to and from the satellite communications is the only method of generating an accurate replica. The present invention assumes this situation. The following will describe a replica signal generation method based on the first method which is applicable to a wide variety of satellite communications lines. In the first method, the delay time is measured by transmitting sum of a primary signal (transmission data) and a wave modulated by a code signal which has a much lower level than the primary signal.

Now, the operation principles of the canceller in the hub station will be described in reference to FIG. 8. The figure illustrates the canceller generating a replica signal (pseudo outbound signal) for the unwanted outbound signal to obtain necessary inbound signals by cancelling the replica signal in the received carrier signals.

Therefore, the canceller's performance depends on how accurately the replica signal (pseudo outbound signal) reproduces the outbound signal. An ideal replica signal matches the outbound signal in all of synchronization timing, frequency, phase, and signal level. Especially important in the delay time measurement in satellite communications is the generating of the replica signal for unwanted carrier cancellation in accurate sync.

If the replica signal is incomplete as illustrated in FIG. 8, the subtraction produces a remaining signal. The remaining signal is termed the remaining error signal because it is an error from the wanted signal, that is, it interferes with the wanted signal. FIG. 9 illustrates exemplary waveforms of an incoming signal, a replica signal, and a remaining error signal produced due to a carrier phase error and a timing error between the incoming signal and the replica signal. A large remaining error signal would affect the BER (bit error rate) performance of the wanted signal.

Next will be described relationship between tolerable BER performance and carrier phase and timing errors in reference to FIG. 10. FIG. 10 illustrates a relationship between carrier power ratio (1/(C/Ihub)) and timing error with varied carrier phase error in 16 QAM (quadrature amplitude modulation). C/Ihub is a carrier interference ratio.

The tolerable level of BER ($10^{-3}$) required with the replica signal is achieved in the hatched area in FIG. 10. Restricting the tolerable range to this range, the carrier phase error needs to be about 1° and not in excess of 2°. Regarding the timing error, the phase difference needs to be about 3° and not in excess of 5° (about 1/100 symbol). See non-patent literature 2. The tolerable timing phase error is the required delay time measurement precision.

1° in timing error is equivalent to about 0.3 ns in time when the transmission rate is 10 mega symbols/second. The timing error therefore needs to be suppressed to about 0.9 to 1.5 ns. In other words, the delay time measurement is required to have a nanosecond-order precision.

As mentioned above, an accurate replica signal needs to be generated to remove an unwanted signal from received carrier signals to cancel an unwanted carrier signal. High precision delay time measurement is needed for that purpose.

Conventional delay time measurement often involves code synchronization based on a delay time measurement code signal. The characteristics of the delay time measurement device used in the delay time measurement vary largely depending, among others, on the correlation property of the delay time measurement code signal, the length of the cycle given as an integral multiple of one bit for a code signal (hereinafter "cycle"), and the frequency band width (integration time for a correlator) for the code synchronization circuit in a delay time measurement device.

Some conventional delay time measurement devices involves code synchronization using a single PN (pseudo noise) code signal as the delay time measurement code signal. The PN code signal is also called the pseudo noise signal.

However, to achieve high precision measurement, this delay time measurement method using a single PN code signal needs an extremely long cycle and synchronization of PN code signals with a long cycle. These requirements lead to an undesirable, long measurement time. The conventional delay time measurement device may take about 10 minutes to measure the time, for example. This is not practical.

Meanwhile, interference between the PN code signal and the carrier signal needs to be avoided. The PN code signal level needs to be sufficiently lower than the carrier signal level. Therefore, the transmission/reception of the PN code signal needs to be carried out in a very low C/N (carrier to noise) environment, which is also a problem. Note that C is the signal level of the delay time measurement code signal and N is the signal level of the signal unwanted in receiving the code signal.

The delay time measurement is required to have a nanosecond order measurement precision as mentioned earlier. Conventional methods take too long a time to meet the required measurement precision level in the low C/N environment.

Synchronization of the delay time measurement code signal is typically acquired by using a correlator outputting a correlation level which corresponds to a theoretical correlation value. The theoretical correlation value indicates similarity between the delay time measurement code signal and the sum of the carrier signal and the delay time measurement code signal. The delay time measurement code signal is typically determined to be in sync if the correlation level exceeds a predetermined threshold.

The theoretical correlation value is constant. On the other hand, if the input level of the received carrier signal varies for whatever reason, the correlation level obtained from the correlator varies with the variation. Accordingly, if the predetermined threshold is fixed, synchronization cannot be acquired in a stable manner.

CITATION LIST

Non-patent literature 1: M. Ichikawa, T. Hara, M. Okada, H. Yamamoto, and K. Andou "Fast and Accurate Canceller on Carrier Super-positioning for VSAT Frequency Reuse," IEEE-WCNC 2005, New Orleans, March, 2005

Non-patent literature 2: H. Kobayashi, M. Osato, T. Hara, M. Okada, and H. Yamamoto, "Signal Cancellation for Satellite Frequency Reuse by Super-positioning multi-level Modulation," IEEE-ISCC 2006, June, 2006

Non-patent literature 3: Noriaki ISHIDA, "Common-band Satellite Communication System," IEIEC Transactions, Vol. J82-B, No. 8, pp 1531-1537, August 1999

Non-patent literature 4: M. Osato, H. Kobayashi, T. Hara, M. Okada, and H. Yamamoto, "Simplified Canceller for Multilevel Modulation Super-positioning for Frequency Reuse Satellite Communications," ITC 2006, May, 2006

Non-patent literature 5: S. W. Golomb, and M. F. Easterling, "Digital Communications with Space Applications," Prentice-Hall, 1964

Non-patent literature 6: T. Hara, M. Fukui, and H. Yamamoto, "Fast and Stable Acquisition by Utilizing Multi-Component Code under Very Low C/N Conditions: Application to Acquisition in TDMA Satellite Communications," Electronics and Communications in Japan, Part 1, Vol. 88, No. 5, 2005

SUMMARY OF INVENTION

The present invention, conceived in view of the conventional problems, has an objective of providing a code synchronization circuit or like circuitry which even in a low C/N environment is capable of high precision timing phase measurement and stable operation against variations in reception level.

A code synchronization circuit according to the present invention is, to solve the problems, characterized by including: reception means for receiving an external carrier signal; variable oscillation means for generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime; a plurality of component code signal generation means for generating the component code signals other than the minimum cycle component code signal when the clock signal is input; first correlation value output means for outputting a first correlation value indicating similarity between the carrier signal and each of the component code signals; code phase control means for controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal; code synchronization determining means for determining whether each of the component code signals is in sync with the carrier signal based on the first correlation value; frequency dividing means for dividing the clock signal by 2 to generate the minimum cycle component code signal; delay means for outputting a delayed minimum cycle component code signal lagging in phase behind the minimum cycle component code signal by half a bit; and second correlation value output means for outputting a second correlation value indicating similarity between the delayed minimum cycle component code signal and the carrier signal, wherein the variable oscillation means controls the frequency of the clock signal according to the second correlation value so that the carrier signal and the clock signal are in sync.

A method of controlling a code synchronization circuit according to the present invention is, to solve the problems, characterized by including the steps of: (a) receiving an external carrier signal (b) generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime; (c) generating the component code signals other than the minimum cycle component code signal when the clock signal is input; (d) outputting a first correlation value indicating similarity between the carrier signal and each of the component code signals; (e) controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal; (f) determining whether each of the component code signals is in sync with the carrier signal based on the first correlation value; (g) dividing the clock signal by 2 to generate the minimum cycle component code signal; (h) outputting a delayed minimum cycle component code signal lagging in phase behind the minimum cycle component code signal by half a bit; and (i) outputting a second correlation value indicating similarity between the delayed minimum cycle component code signal and the carrier signal, wherein in step (b), the frequency of the clock signal is controlled according to the second correlation value so that the carrier signal and the clock signal are in sync.

According to the structure or method, an external carrier signal is received, and a clock signal is generated with a variable frequency for generation of component code signals other than a minimum cycle component code signal having a minimum cycle. All the component code signals, including the minimum cycle component code signal, are used to generate a multi-component code signal and have cycles which, given as integral multiples of one bit length, are relatively prime.

Next, the component code signals other than the minimum cycle component code signal are generated in response to the inputting of the clock signal.

Thereafter, the first correlation value indicating similarity between the carrier signal and each of the component code signals is output. The phases of the component code signals, other than the minimum cycle component code signal, which are out of sync with the carrier signal are controlled according to the first correlation value so that each of the component code signals, other than the minimum cycle component code signal, which are out of sync with the carrier signal is in sync with the carrier signal.

In addition, it is determined, based on the first correlation value, whether each of the component code signals is in sync with the carrier signal.

In this code synchronization circuit and like circuitry, the minimum cycle component code signal is generated by dividing the clock signal by 2, and the delayed minimum cycle component code signal is output lagging in phase behind the minimum cycle component code signal by half a bit. Thereafter, the second correlation value indicating similarity between the delayed minimum cycle component code signal and the carrier signal is output, and the frequency of the clock signal is controlled according to the second correlation value so that the carrier signal and the clock signal are in sync.

In other words, the code synchronization circuit and like circuitry according to the present invention designate the half-rate clock signal as the minimum cycle component code signal and utilize the minimum cycle component code signal in the synchronizing of the clock signal commonly to each of the component code signals other than the minimum cycle component code signal and the carrier signal. Therefore, synchronization is acquired between the carrier signal and the minimum cycle component code signal and also between the carrier signal and the clock signal.

In addition, by using the second correlation value indicating similarity between the carrier signal and the delayed minimum cycle component code signal lagging in phase behind the minimum cycle component code signal by half a bit, the point at which the phase shift (phase error) of the clock signal is 0 when the second correlation value is 0 is made to match the synchronization point of the carrier signal and the clock signal.

It is hence possible to form a loop called a phase-locked loop from the loop made up of the second correlation value output means, the variable oscillation means, the frequency dividing means, and the delay means.

As described in the foregoing, small variations in the input level of the received carrier signal do not produce large affect on stable acquisition of synchronization between the clock signal and the carrier signal because the synchronization point of the carrier signal and the clock signal is designed close to a point where the second correlation value is 0 and the clock signal has a phase shift of 0. Therefore, the resultant code synchronization circuit and like circuitry, even when used in a low C/N environment, is capable of high precision timing phase measurement and stable operation against variations in the reception level.

Another code synchronization circuit according to the present invention is, to solve the problems, characterized by including: reception means for receiving an external carrier signal; variable oscillation means for generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime; a plurality of component code signal generation means for generating the component code signals other than the minimum cycle component code signal when the clock signal is input; first correlation value output means for outputting a first correlation value indicating similarity between the carrier signal and each of the component code signals; code phase control means for controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal; code synchronization determining means for determining that when the first correlation value exceeds synchronization determining each threshold specified according to a number of component code signals which are in sync with the carrier signal, a number of component code signals are in sync, the latter number corresponding to the former number; frequency dividing means for dividing the clock signal by 2 to generate the minimum cycle component code signal; third correlation value output means for outputting a third correlation value indicating similarity between the carrier signal and the minimum cycle component code signal; and threshold control means for changing the synchronization determining the threshold according to the third correlation value.

Another method of controlling a code synchronization circuit according to the present invention is, to solve the problems, characterized by including the steps of: (a) receiving an external carrier signal; (b) generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime; (c) generating the component code signals other than the minimum cycle component code signal when the clock signal is input; (d) outputting a first correlation value indicating similarity between the carrier signal and each of the component code signals; (e) controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal; (f) determining that when the first correlation value exceeds synchronization determining each threshold specified according to a number of component code signals which are in sync with the carrier signal, a number of component code signals are in sync, the latter number corresponding to the former number; (g) dividing the clock signal by 2 to generate the minimum cycle component code signal; (h) outputting a third correlation value indicating similarity between the carrier signal and the minimum cycle component code signal; and (i) changing the synchronization determining the threshold according to the third correlation value.

According to the structure or method, an external carrier signal is received, and a clock signal is generated with a variable frequency for generation of component code signals other than a minimum cycle component code signal having a minimum cycle. All the component code signals, including the minimum cycle component code signal, are used to generate a multi-component code signal and have cycles which, given as integral multiples of one bit length, are relatively prime.

Next, the component code signals other than the minimum cycle component code signal are generated in response to the inputting of the clock signal.

Thereafter, the first correlation value indicating similarity between the carrier signal and each of the component code signals is output. The phases of the component code signals, other than the minimum cycle component code signal, which are out of sync with the carrier signal are controlled according to the first correlation value so that each of the component code signals, other than the minimum cycle component code signal, which are out of sync with the carrier signal is in sync with the carrier signal.

In addition, when the first correlation value exceeds synchronization determining each threshold specified according to a number of component code signals which are in sync with the carrier signal, a number of component code signals are determined to be in sync, the latter number corresponding to the former number.

In this code synchronization circuit and like circuitry, the minimum cycle component code signal is generated by dividing the clock signal by 2, and the third correlation value indicating similarity between the carrier signal and the minimum cycle component code signal is output so as to change the synchronization determining the threshold according to the third correlation value.

Variations in the correlation level outputs from the first correlation means and the third correlation means may be safely regarded as being substantially in proportion to variations in the reception level. Therefore, if the predetermined thresholds are adjusted according to the variations in the third correlation level with respect to the variations in the reception level, the first correlator is able to make a decision as to synchronization without being critically affected by the variations in the reception level.

The synchronization determination thresholds can hence be adjusted according to the variations in the reception level of the received signal. The resultant code synchronization circuit and like circuitry, even when used in a low C/N environment, is capable of high precision timing phase measurement and stable operation against variations in the reception level.

Another code synchronization circuit according to the present invention is, to solve the problems, characterized by including: reception means for receiving an external carrier signal; variable oscillation means for generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime; a plurality of component code signal generation means for generating the component code signals other than the minimum cycle component code signal when the clock signal is input; first correlation value output means for outputting a first correlation value indicating similarity between the carrier signal and each of the component code signals; code phase control means for controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal; code synchronization determining means for determining that when the first correlation value exceeds synchronization determining each threshold specified according to a number of component code signals which are in sync with the carrier signal, a number of component code signals are in sync, the latter number corresponding to the former number; frequency dividing means for dividing the clock signal by 2 to generate the minimum cycle component code signal; third correlation value output means for outputting a third correlation value indicating similarity between the carrier signal and the minimum cycle component code signal; and level correction means for correcting a level of the first correlation value according to a level of the third correlation value.

Another method of controlling a code synchronization circuit according to the present invention is, to solve the problems, characterized by including the steps of: (a) receiving an external carrier signal; (b) generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime; (c) generating the component code signals other than the minimum cycle component code signal when the clock signal is input; (d) outputting a first correlation value indicating similarity between the carrier signal and each of the component code signals; (e) controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal; (f) determining that when the first correlation value exceeds synchronization determining each threshold specified according to a number of component code signals which are in sync with the carrier signal, a number of component code signals are in sync, the latter number corresponding to the former number; (g) dividing the clock signal by 2 to generate the minimum cycle component code signal; (h) outputting a third correlation value indicating similarity between the carrier signal and the minimum cycle component code signal; and (i) correcting a level of the first correlation value according to a level of the third correlation value.

According to the structure or method, the minimum cycle component code signal is generated by dividing the clock signal by 2, and the third correlation value indicating similarity between the carrier signal and the minimum cycle component code signal is output, so as to correct a level of the first correlation value according to a level of the third correlation value.

Variations in the correlation level outputs from the first correlation means and the third correlation means may be safely regarded as being substantially in proportion to variations in the reception level. Therefore, if the correlation level output from the first correlator is corrected according to the variations in the third correlation level with respect to the variations in the reception level, a decision can be made as to synchronization without being critically affected by the variations in the reception level.

The synchronization determination correlation level can hence be adjusted according to the variations in the reception level of the received signal. The resultant code synchronization circuit and like circuitry, even when used in a low C/N environment, is capable of high precision timing phase measurement and stable operation against variations in the reception level.

Additional objectives, advantages and novel features of the invention will be set forth in part in the description which follows, and in part will become apparent to those skilled in the art upon examination of the following or may be learned by practice of the invention.

BRIEF DESCRIPTION OF DRAWINGS

FIG. 5 is a drawing depicting an exemplary correlation matrix for use in examination of the correlation property of a multi-component code signal W and a component code signal X.

FIG. 8 is a schematic illustration illustrating the operation principles of a canceller in cancelling an unwanted carrier.

FIG. 9 is a drawing depicting waveforms of an unwanted carrier, an associated replica signal, and a remaining error signal produced due to a carrier phase error and a timing phase error between the unwanted carrier and the replica signal.

FIG. 10 is a drawing for evaluation of precision required of the code synchronization circuit.

FIG. 11 is a schematic illustration of delay time required in replica signal generation in carrier superimposition.

FIG. 13 is a drawing depicting an exemplary structure of a multi-component code signal W used in the code synchronization circuit.

FIG. 14 is a drawing depicting an exemplary auto-correlation matrix for use in examination of the auto-correlation property of a multi-component code signal W used in the code synchronization circuit.

FIG. 16 is a schematic illustration of delay time measurement principles for the delay time measurement device.

FIG. 18 is a drawing depicting, among others, a step determination error rate in each step in relation to a correlation value and synchronization states of component code signals X, Y, and Z with a carrier signal.

FIG. 21 is a drawing for evaluation of an integration bit number required of a correlator in the code synchronization circuit.

REFERENCE SINGS LIST

Figure 1:
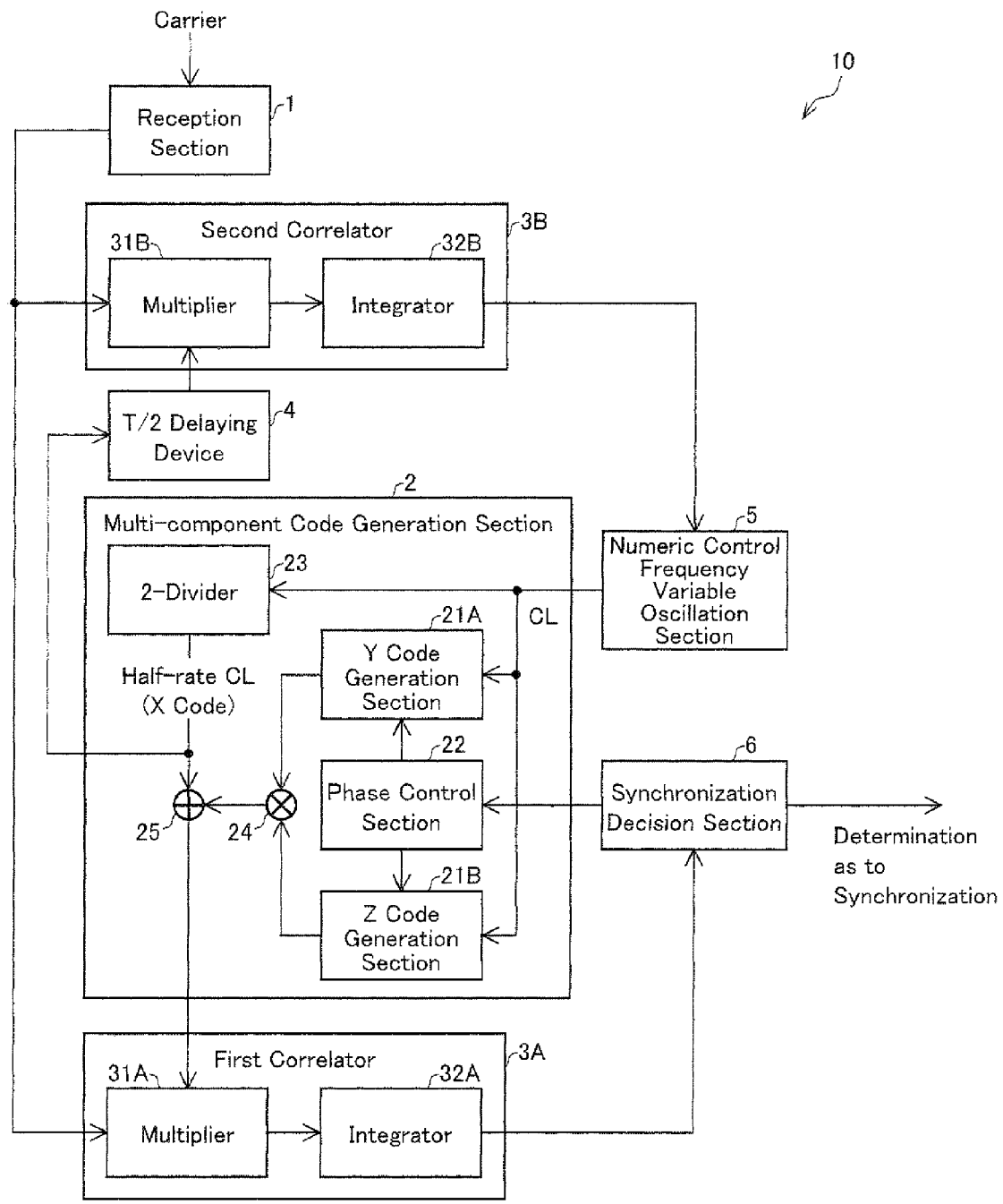
FIG. 1 is a functional block diagram of an exemplary code synchronization circuit in accordance with the present invention.

1 Reception Section (Reception Means)
2 Multi-component Code Generation Section (Multi-component Code Signal Generation Means, Multi-component Code Signal Reproduction Means)
3A First Correlator (First Correlation Value Output Means)
3B Second. Correlator (Second Correlation Value Output Means)
3C Third Correlator (Third Correlation Value Output Means)
4 T/2 Delay Device (Delay Means)
5 Numeric Control Frequency Variable Oscillation Section (Variable Oscillation Means)
6 Synchronization Determining Section (Code Synchronization Determining Means)
7 Threshold Control Section (Threshold Control Means)
8 Correlation Level Correction Section (Level Correction Means)
10 to 30 Code Synchronization Circuit
11 Synchronization Determining/Reproduced Multi-component Code Output Control Section (Multi-component Code Signal Reproduction Means)
12 Transmission Multi-component Code Generation Section (Transmission Multi-component Code Signal Generation Means)
13 Transmission Section (Transmission Means)
14 Delay Time Calculation Section 14 (Delay Time Calculation Means)
15 Multi-component Code Phase Difference Computation Section
16 $\tau = n \cdot T + \alpha$ Calculation Section
21A Y Code Generation Section (Component Code Signal Generation Means)
21B Z Code Generation Section (Component Code Signal Generation Means)
23 2-Divider (Frequency Dividing Means)
24 Multiplier
25 Adder
31A to 31C Multiplier
32A to 32C Integrator
40 Delay Time Measurement Device
81 a/c Calculator
82 ½ Calculator
W, w Multi-component Code Signal
X to Z Component Code Signal
x Shift Component Code Signal

DESCRIPTION OF EMBODIMENTS

The following will describe an embodiment of the present invention in reference to FIGS. 1 to 6 and 11 to 21. For convenience of description, the following embodiment will assume that the present invention is applied to frequency superimposition. This is however by no means the only possible application of the present invention.

Referring to FIGS. 11 to 21, the following will first describe concepts and definitions of special terms which are essential to the understanding of the present invention.

1. Definitions of Delay Time in Frequency Superimposition

A definition will be given first to the delay time needed in generating a replica signal in frequency superimposition in reference to FIG. 11. The figure illustrates the concept of a delay time $\tau$ which needs to be measured by a canceller in frequency superimposition.

As illustrated in FIG. 11, the carrier signal (outbound signal) transmitted from an earth station (hub station) is received by the satellite and then sent back to the earth station from the satellite. Therefore, the delay time $\tau$ needed in generating a replica signal for signal cancellation is theoretically equal to the round trip time of the signal between the earth station and the satellite. The wanted signal is obtainable by generating a replica signal at the synchronization timing delayed by the delay time $\tau$ and cancelling in the received carrier signals.

2. Basic Structure of Delay Time Measurement Device

Figure 12:
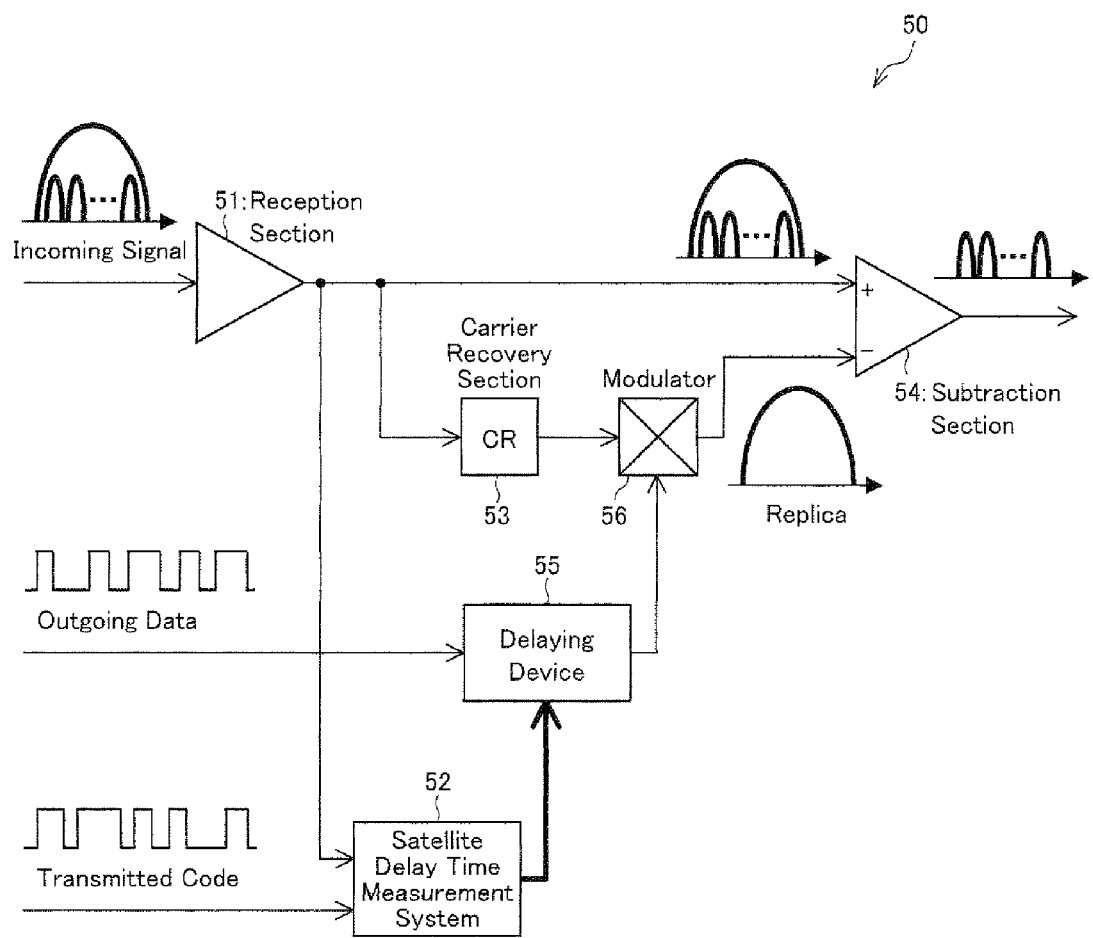
FIG. 12 is a functional block diagram of a typical canceller structure.

Next will be described the basic structure of the canceller in reference to FIG. 12. The figure is a functional block diagram of the basic structure of the canceller 50 which is an example of typical cancellers. The canceller 50 includes a reception section 51, a satellite delay time measurement system 52, a CR (carrier recovery) 53, a subtraction section 54, a delay device 55, and a modulator 56 as illustrated in FIG. 12. Preferably, the satellite delay time measurement system 52 uses, for example, a delay time measurement device 40 (detailed later). It is also preferable if any one of code synchronization circuits 10 to 30 (detailed later) is used in the delay time measurement device 40.

Now, the operation of the canceller 50 will be described in reference to FIG. 12. An incoming signal received by the reception section 51 is sent along three paths to the satellite delay time measurement system 52, the CR 53, and the subtraction section 54, respectively. The satellite delay time measurement system 52 determines the delay time from the phase difference between a reception code signal carried on the incoming signal and a transmission code signal generated continuously in the system 52. The CR 53 reproduces a carrier (carrier wave) contained in the incoming signal.

The delay device 55 delays the synchronization timing of the transmission data signal by a delay time obtained by the satellite delay time measurement system 52. The modulator 56 modulates the carrier reproduced by the CR 53 with the delayed transmission data signal output from the delay device 55. The replica signal is thus reproduced. The subtraction section 54 subtracts the replica signal from the incoming signal to output a wanted wave.

3. Multi-Component Code Signal

The use of a multi-component code signal composed of multiple component code signals in delay time measurement is known to efficiently shorten the measurement time. See non-patent literature 2. The acquisition and maintaining of synchronization of the multi-component code signal makes use of a correlation property of the multi-component code signal that the auto-correlation, indicating similarity between identical multi-component codes, could take different, but invariable values.

The multi-component code signal is a code signal obtained by combining a plurality of component code signals of different cycles each of which is an integral multiple of one bit length (hereinafter, "cycle") through a computation. If the cycles of the component code signals are relatively prime, the cycle of the multi-component code signal is equal to the product of the cycles of the component codes. The number of phase shifts (number of bit shifts) for the synchronization of the multi-component code signal is, due to the multiplicity of the correlation value, equal to the sum of the number of phase shifts for the synchronization of the component codes. For example, in the case of PN code signals having cycles L, M, and N respectively, the multi-component code signal has a cycle equal to L×M×N. Under the same conditions, the number of phase shifts required to acquire synchronization is no greater than L+M+N.

In contrast, in the case of a single PN code signal having the same cycle (=L×M×N) as the multi-component code signal, the number of phase shifts required to acquire synchronization is equal to L×M×N. By using of the multi-component code signal, the number of phase shifts is reduced by a factor of L×M×N/(L+M+N) when compared with a case where the single code signal having the same cycle is used.

The correlation property of the multi-component code signal is known to be statistically analyzable using an auto-correlation matrix. However, the auto-correlation value normally varies with the phase shift between two identical code signals. If the auto-correlation value changes, the acquisition error rate and the detection error rate in the acquisition of synchronization increase. If the acquisition error rate and the detection error rate increases, the synchronization takes more time. It is therefore important in accurate delay time measurement to find a suitable combination of component code signals which has an invariable auto-correlation value against phase shifts.

The component code signals are ideally random sequence code signals with complete randomness like a noise sequence with zero temporary correlation. It is however impossible to achieve complete randomness with a random sequence code signal having an finite cycle. To achieve complete randomness, a random sequence code signal with an infinite cycle is needed.

The M sequence code signal is popularly known as a PN code signal (pseudo random code signal) which has the most similar properties to noise and mathematically known and implementable. The correlation property is examined by computer simulation for two cases (an M sequence code signal is used in one, and a random sequence code signal is used in the other) to find a suitable combination of component code signals. The correlator is preferably highly stable in determining synchronization to design a code synchronization circuit against variations in an input level. For this purpose, the stability against phase shifts in the correlation value when a particular multi-component code signal is used plays an important role in the design of a code synchronization circuit.

4. Correlation Property of Multi-Component Code Signal

FIG. 13 depicts an exemplary multi-component code signal composed of particular component code signals X, Y, and Z according to the equation:

$$W = X \oplus (Y \cdot Z) \qquad \text{Math 1}$$

where $$\oplus \qquad \text{Math 2}$$

(hereinafter, "+" may be used instead for convenience) represents an exclusive OR, and "·" represents a multiplication. The multi-component code signal W is composed, as illustrated in FIG. 13, of three component codes.

An exclusive OR is addition governed by the rules: 0+0=0, 1+0=1, 0+1=1, and 1+1=0. It differs from an ordinary addition in that 1+1=0. For example, see the first column in FIG. 13. The multi-component code signal W=0 when X=0, Y=0, Z=1 for the following reasons. Since Y·Z=0·1=0, the obtained 0 is exclusive ORed with X=0. Then, W=0+0=0 is obtained.

The last column in FIG. 13 shows that the multi-component code signal W=0 when X=Y=Z=1 for the following reasons. Since Y·Z=1·1=1, the obtained 1 is exclusive ORed with X=1. Then, W=1+1=0 is obtained.

The auto-correlation property of the multi-component code signal W can be readily evaluated through analysis of an auto-correlation matrix shown in FIG. 14. The figure shows an exemplary auto-correlation matrix for the multi-component code signal W (or w) shown in FIG. 13.

First, if none of the component code signals X, Y, and Z are out of sync, there are 64 possible W and w combinations.

The correlation value C is defined as:

$$C = (\text{Number of 0s} - \text{Number of 1s})/(\text{Number of 0s} + \text{Number of 1s})$$

Of the 64 combinations, the number of 0s=the number of 1s=32. The correlation value Callout=(32−32)/64=0 in this case.

Next, if only the component code signal X is in sync, there are a total of 32 possible combinations (indicated by "X Agreed" in FIG. 14). The correlation value CX is (20−12)/32=0.25 in this case.

If either the component code signals X and Y or the component code signals X and Z are in sync, there are a total of 16 possible combinations (indicated by "X and Y Agreed" in FIG. 14). The correlation value CXY (or CXZ) is (12−4)/16=0.5 in this case.

Finally, if the component code signals X, Y, and Z are all in sync, there are a total of 8 possible combinations (indicated by "All Agreed" in FIG. 14). The correlation value Call is (8−0)/8=1 in this case. See non-patent literature 5.

5. Principles of Delay Time Measurement When Single Code Signal is Used

Figure 15:
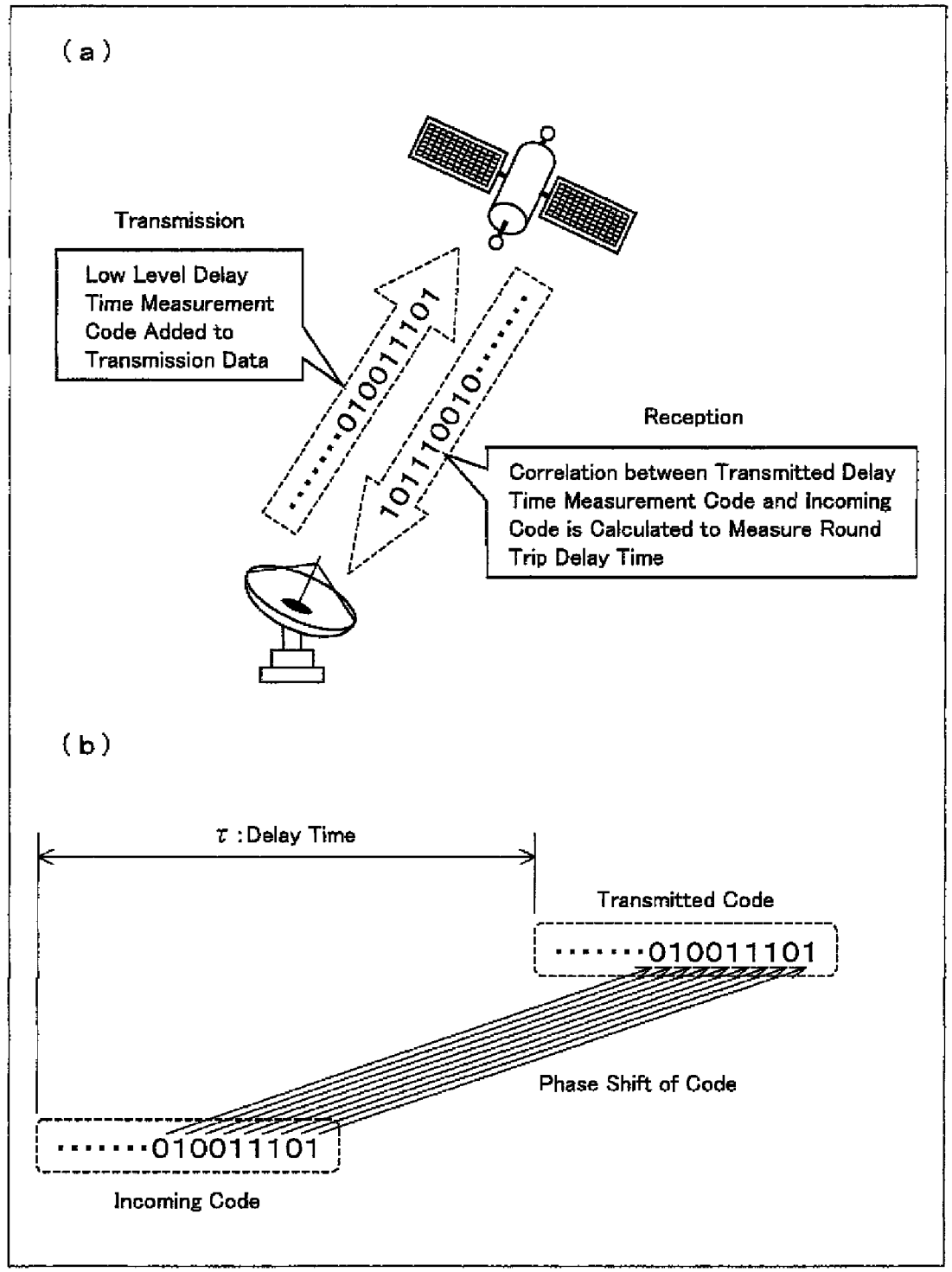
FIG. 15 is a schematic illustration of delay time, (a) depicting delay time measurement principles when a single PN code is used and (b) depicting a delay time calculation method.

Use of a single code signal as the delay time measurement code signal will be described in reference to (a) of FIG. 15 and (b) of FIG. 15 for simplicity. Referring to (a) of FIG. 15, a carrier signal obtained by adding a delay time measurement code signal to a carrier (carrier wave) modulated with transmission data is first transmitted from the earth station to the geostationary satellite. The geostationary satellite transmits the received carrier signal back to the earth station. The earth station then calculates the correlation between the received carrier signal and the transmitted delay time measurement code signal (hereinafter, may be abbreviated as "transmission code signal") to measure a round trip delay time.

Next will be described principles of delay time measurement when a single code signal is used in reference to (b) of FIG. 15. Referring to (a) of FIG. 15, the transmission code signal is continuously generated by the earth station. Meanwhile, the reception code signal is the transmission code signal transmitted back from the satellite and received by the earth station with a delay time. The reception code signal generally hardly preserves its original form because it is disturbed by noise and other factors. The reception code signal is reproduced by calculating the correlation between the reception code signal and the transmission code signal. The transmission code in (b) of FIG. 15 is the transmission code signal continuously generated by the earth station. The reception code is the reproduced reception code signal mentioned above. It would be appreciated that the delay time τ can be in principle calculated from the phase difference between these signals. The delay time τ is calculated as the product: Phase Difference (Bit Length or Frame Length of Shift)×Bit Rate.

6. Choosing Multi-Component Code Signal

Now, the correlation property by which the objective of the present invention is achievable will be described. A delay time measurement method will also be described, taking as an example a multi-component code signal composed of component code signals having relatively short cycles. The multi-component code signal according to the present embodiment is composed of a code signal obtained from a clock signal by dividing the clock frequency by 2 (1 cycle=2 bits, or "cycle=2") as the component code signal X, an M sequence code signal having a cycle of 63 as the component code signal Y, and an M sequence code signal having a cycle of 127 as the component code signal Z.

Figure 17:
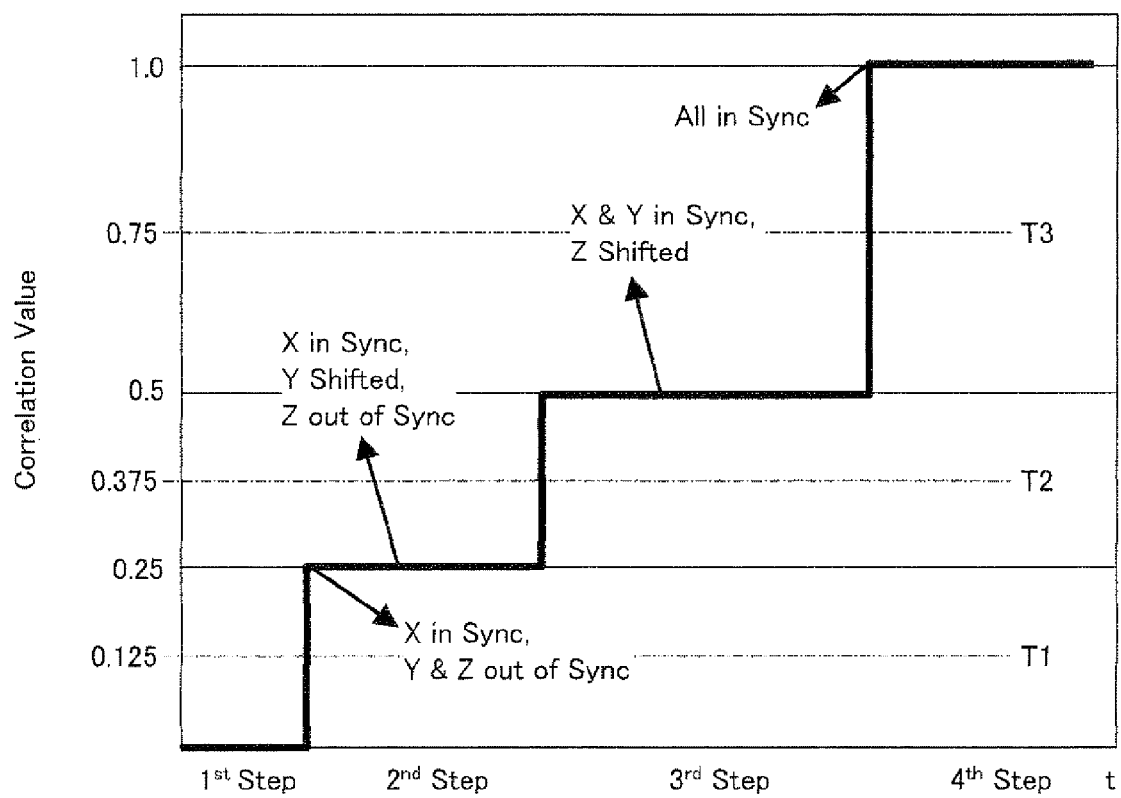
FIG. 17 is a drawing depicting a relationship between a correlation value and synchronization states of component code signals X, Y, and Z with a carrier signal.

The distance to the geostationary satellite is about 36,000 km and the round trip delay time is about 250 ms. The satellite's orbit drifts 100 km per day. The delay time is about 0.66 (=0.33×2) ms. As illustrated in FIG. 16, One frame, or a 16,002-bit cycle, is equivalent to 1.6002 ms when the bit rate is 10 Mbps. One round trip time is equivalent to 154+α (0≦α<1) frames. The issue in the delay time measurement is to measure the real number a (delay time for 1 frame) because 154 frames is always constant. The time taken by the acquisition of synchronization of the multi-component code signal composed of component code signals having respective cycles of 2, 63, and 127 is the sum of the times taken by the search for the three component code signals. FIG. 17 is a drawing depicting a relationship between the state of the multi-component code signal and four correlation values.

None of the component code signals X, Y, and Z are in sync in the first step ($1^{st}$ Step) where the correlation value equals 0. In the second step ($2^{nd}$ Step) where the correlation value equals 0.25, only the component code signal X is in sync, and the component code signal Y to be searched for next is phase-shifted. The component code signals X and Y are in sync, and the component code signal Z to be searched for next is phase-shifted, in the third step ($3^{rd}$ Step) where the correlation value equals 0.5. Finally, if the correlation value becomes equal to 1, the component code signals X, Y, and Z are all in sync.

The multi-component code signal needs to be transmitted/received 25 dB lower in power density than the main carrier signal to avoid interfering with the main carrier signal. Accordingly, a synchronization determination error rate in the acquisition of synchronization of the multi-component code signal will be described in reference to FIG. 18. The figure is obtained from computer simulation of the determination error rate in the acquisition of synchronization.

Determination error can occur in a noisy environment because the correlation values are multiplexed, and the intervals between the correlation values are short. T1, T2, and T3 are thresholds distinguishing between the four correlation values. The noise distributed at each correlation level remains the same when the S/N ratio is specified. The thresholds are set in the middle of the correlation values.

Figure 19:
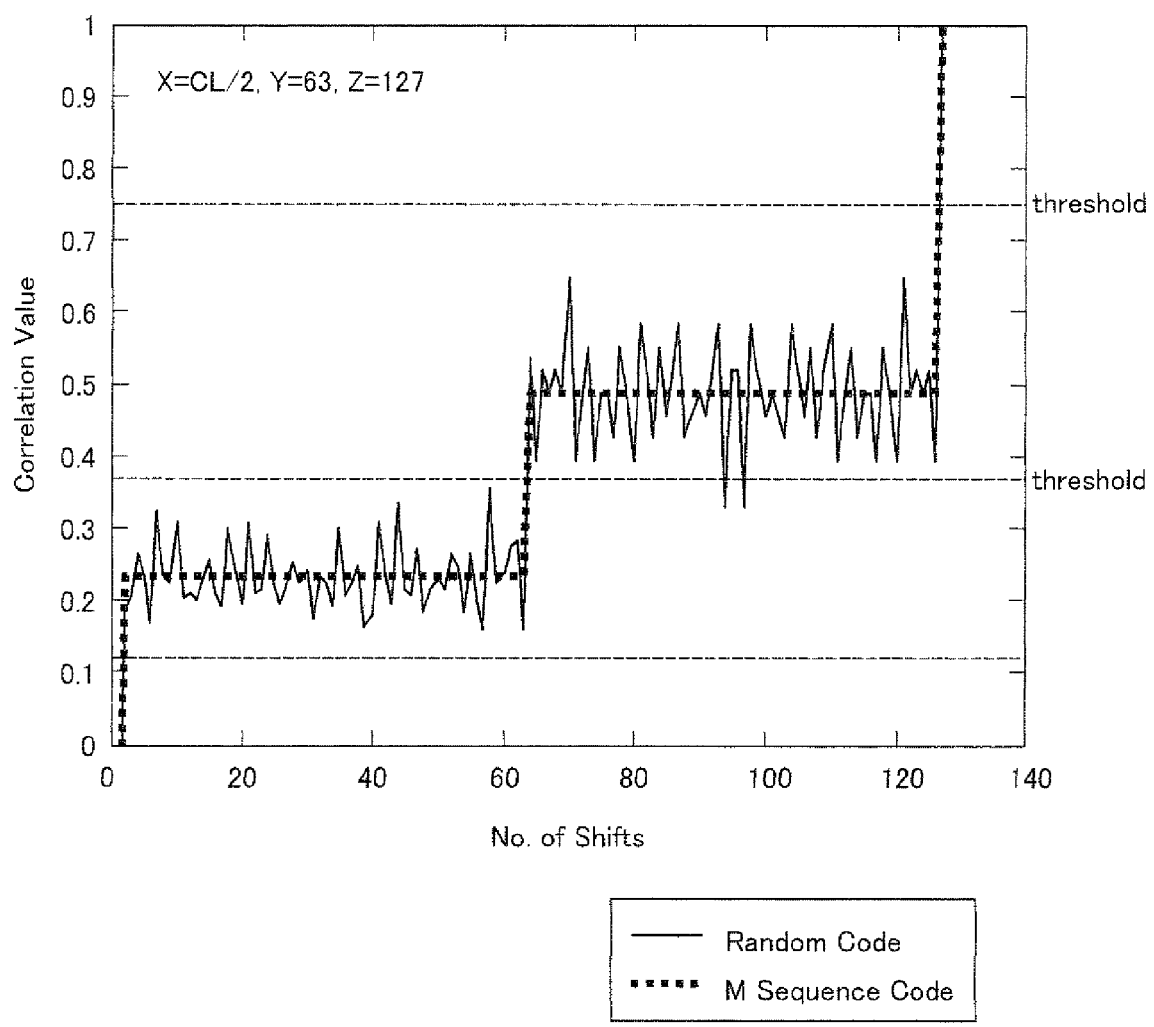
FIG. 19 is a drawing depicting changes of a correlation value with a phase shift when a random sequence code and a particular M sequence code are used.

In FIG. 18, p1 is the probability of determining the second step as the first step or the third step, and q1 is probability of determining the third step as the second step or the fourth step. If such a determination error occurs, it takes more time to acquire synchronization.

as mentioned earlier, the synchronization of the multi-component code signal is acquired by detecting the four-level correlation values. The correlation assumes an inherent value under the conditions that the component code signals have sufficiently long cycles and statistically random. However, the selected component code signals X, Y, and Z have respective cycles of 2, 63, and 127 as illustrated in FIG. 19, and it turns out that the actually component code signal does not need to be very long.

as mentioned earlier, it is important whether the correlation assumes a predetermined value when each component code signal X, Y, and Z having such a short cycle is phase-shifted. The correlation is calculated for each step by computer simulation. The solid line in the graph of FIG. 19 indicates changes of the correlation value where random sequence codes are used for the component code signals Y and Z.

The broken line in the graph indicates changes of the correlation value where M sequence codes are used for the component code signals Y and Z. Obvious difference is observable in the changes of the correlation value between the two cases. The difference will be described in detail below.

The solid line in the graph indicates that the correlation value deviates greatly from an inherent value across various numbers of phase shifts for the component code signal. The problem here is that no matter how long a code signal is used, the correlation value deviates from the inherent value so long as a random sequence code signal is used. The results show that the random sequence code signal is required to have complete randomness and also that for this requirement, the random sequence code signal needs to have an infinitely long cycle.

Where the correlation value deviates from the inherent value, the step determination error rate increases further in a noisy environment like the one shown in FIG. 18. In addition, the solid line in the graph of FIG. 19 where a random sequence code signal is used exceeds a threshold at some places even in the absence of noise. The results show that no random sequence code signal should be used for the component code signal.

In contrast, the broken line in the graph where an M sequence code signal is used is very stable. From analysis of the auto-correlation of the multi-component code signal where M sequence code signals are used for the component code signals Y and Z, a theoretical correlation value is obtained for different sets of conditions as follows. Note that the three component code signals X, Y, and Z have respective cycles of L, M, and N.

(a) None of the component code signals X, Y, and Z are in sync:

$$Callout = -\frac{1}{4} \cdot \{MN - 3(M+N+1)\}/LMN = -1/(4L) \approx 0$$

(b) Only the component code signal X is in sync:

$$CX = L/4 \cdot \{MN - 3(M+N+1)\}/LMN = \frac{1}{4} = 0.25$$

(c) Either the component code signals X and Y or X and Z are in sync:

$$CXY = CXZ = L/2 \cdot \{MN - (M+N+1)\}/LMN \approx 0.5$$

(d) All the component code signals X, Y and Z are in sync:

$$Call = LMN/LMN = 1.0$$

These equations demonstrate that the auto-correlation of the code signal indicated by the broken line in the graph assumes a constant value regardless of the phase shift of each component code signal.

In addition, as will be detailed later, the correlation property is excellent even with a short cycle if M sequence codes are used for the component code signals Y and Z.

Figure 20:
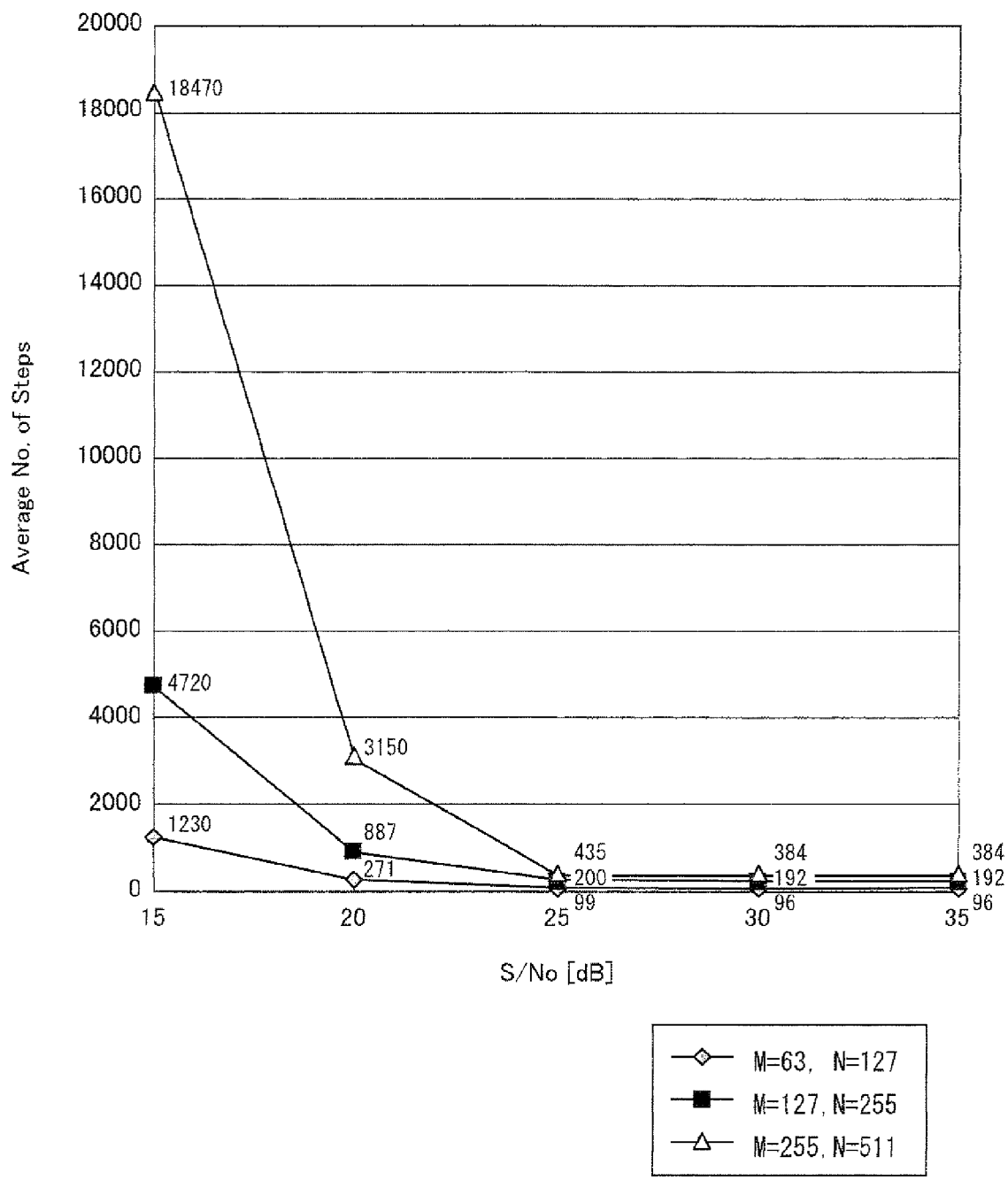
FIG. 20 is a drawing depicting a relationship between an S/N ratio and an average number of steps for 3 multi-component code signals.

FIG. 20 shows, as a function of the ratio of the correlation value to the S/N ratio (signal to noise), average number of steps for acquiring synchronization a total of three multi-component code signals containing the multi-component code signals having different cycles. The cycle of the component code signal X is 2 and shared commonly by these multi-component code signals. The results shown in FIG. 20 are obtained by solving the theoretical equation disclosed in non-patent literature 6. The S/N ratio improves by lengthening the integration time in the correlator and increasing the S/N ratio upon reception. The multi-component code signals (L=2, M=63, N=127) excellent characteristics as can be seen in FIG. 20.

For example, when the S/N ratio is 25 dB, the average number of phase-shifting steps for acquiring synchronization of the multi-component code signal composed of the component code signals having cycles M=63 and N=127 is 99. Meanwhile, for acquiring synchronization of the multi-component code signal composed of the component code signals having cycles M=127 and N=255, the average number of steps is 200 under the same conditions. The average number of steps is as high as 435 for acquiring synchronization of the multi-component code signal composed of the component code signals having cycles M=255 and N=511. These results indicate that the cycles of the component code signals are not necessarily very long if M sequence codes are used as the component code signals Y and Z.

Accordingly, we choose for the description below a multi-component code signal composed of the component code signals X, Y, and Z having respective cycles L=2, M=63, and N=127.

FIG. 21 is a table showing, among other things, a relationship between the correlator integration time and the average synchronization acquisition time when the multi-component code signal is chosen. FIG. 21 indicates that it is desirable if $10^5$ bits is selected as the integration time. With this integration time, the average synchronization acquisition time is 0.99 sec. because the average number of phase shifts is 99, and the time taken for each shifting is 0.01 sec. The S/N ratio improves by 50 dB because the S/N ratios at input and output are both 25 dB.

Next will be described the structure and operation of the code synchronization circuit, the delay time measurement device, and other components in accordance with an embodiment of the present invention in reference to FIGS. 1 to 6 and 17.

7. Code Synchronization Circuit

Example 1

The structure of a code synchronization circuit 10 which is an exemplary code synchronization circuit in accordance with the present invention will be described first in reference to FIGS. 1, 5, (a) of FIG. 6, and (b) of FIG. 6. Referring to FIG. 1, the code synchronization circuit 10 includes a reception section (reception means) 1, a multi-component code generation section (multi-component code signal generation means, multi-component code signal reproduction means) 2, a first correlator (first correlation value output means) 3A, a second correlator (second correlator output means) 3B, a T/2 delay device (delay means) 4, a numeric control frequency variable oscillation section (variable oscillation means) 5, and a synchronization determining section (code synchronization determining means) 6.

The reception section 1 receives externally fed carrier signals. The multi-component code generation section 2 generates a component code signal (minimum cycle component code signal) X and component code signals Y and Z to compose a multi-component code signal W by carrying out suitable calculation on these component code signals. The section 2 includes a Y code generation section (component code signal generation means) 21A, a Z code generation section (component code signal generation means) 21B, a phase control section (code phase control means) 22, a 2-divider (frequency dividing means) 23, a multiplier 24, and an adder 25.

The Y code generation section 21A and the Z code generation section 21B generate respectively component code signals Y and Z when a clock signal is fed. As mentioned earlier, the component code signals X, Y and Z are respectively a half-rate clock signal having a cycle of 2, an M sequence code signal having a cycle of 63, and, an M sequence code signal having a cycle of 127 in the present embodiment. This is, however, by no means the only possible set of component code signals. An alternative set when the component code signal X has a cycle of L (0<L) may include any such PN code signals (pseudo noise signals) as the component code signals Y and Z that the cycles L, M, and N of the respective component code signals X, Y, and Z (0<L≦M≦N; L, M and N are integers) are relatively prime.

The phase control section 22 controls the phases of the component code signals Y and Z (component code signals except for the component code signal X) out of sync with the carrier signal so that the phases can be in sync in order to synchronize the component code signals Y and Z out of sync with the carrier signal with the carrier signal.

The 2-divider 23 divides by 2 the frequency of the clock signal generated by the numeric control frequency variable oscillation section 5. The clock frequency is divided by 2 because the original clock signal has a cycle corresponding to 1 bit, and the resultant clock signal (cycle=2 bits) is used as the minimum cycle component code signal X. In other words, a half-rate clock signal is used as the minimum cycle component code signal X.

The multiplier 24 computes the product of the component code signals Y and Z (=Y·Z). The adder 25 exclusive ORs the product Y·Z for integration.

The first correlator 3A outputs a correlation level corresponding to the first theoretical correlation value which is an index of similarity between the carrier signal and each of the component code signals X, Y, and Z. The first correlator 3A includes a multiplier 31A and an integrator 32A. The multiplier 31A multiplies the carrier signal by the multi-component code signal composed of the component code signals X, Y, and Z. The integrator 32A sums the results of computation by the multiplier 31A for integration. The summing is done by exclusive OR operation.

The second correlator 3B outputs a correlation level corresponding to the second theoretical correlation value which is an index of similarity between the carrier signal and a delayed component code signal x (delayed minimum cycle component code signal) obtained by delaying the phase of the component code signal X by ½ bit.

The second correlator 3B includes a multiplier 31B and an integrator 32B. The multiplier 31B multiplies the carrier signal by the delayed component code signal x. The integrator 32B sums the results of computation by the multiplier 31B for integration. The summing is done by exclusive OR operation.

The T/2 delay device 4 delays the phase of the component code signal X by ½ bit to generate the delayed component code signal x.

The numeric control frequency variable oscillation section 5 generates a clock signal with a frequency varied according to the correlation level output from the second correlator 3B to control the synchronization between the carrier signal and the clock signal. The synchronization determining section 6 determines, from the correlation level output from the first correlator 3A, whether or not the carrier signal and each of the component code signals X, Y, and Z are in sync. A threshold is predetermined in the present embodiment so that the component code signal is determined to be in sync if the threshold is exceeded. However, the determination as to synchronization may be made in any other manner.

Next will be described the operation of the code synchronization circuit 10 in reference to FIG. 1. The numeric control frequency variable oscillation section 5 generates a clock signal. The clock signal takes three paths. The clock signal on one path is divided by 2 in the 2-divider 23. The resultant clock signal has a cycle of 2 bits. The code signal with double the cycle is called the component code signal X. Meanwhile, the clock signal on the two other paths is fed to the Y code generation section 21A and the Z code generation section 21B. The Y code generation section 21A and the Z code generation section 21B generate the component code signals Y and Z in sync with the rises of the incoming clock signal. The component code signals Y and Z may be generated in any other manner. For example, the component code signals Y and Z may be generated in sync with the falls of the clock signal.

The component code signal X is phase delayed by ½ bit in the T/2 delay device 4 to generate a delayed component code signal x.

The delayed component code signal x and the carrier signal received by the reception section 1 are fed to the second correlator 3B which outputs a correlation level corresponding to the second theoretical correlation value which is an index of similarity between the delayed component code signal x and the carrier signal.

The numeric control frequency variable oscillation section 5 controls the frequency of the clock signal according to the correlation level output from the second correlator 3B so that the carrier signal is in sync with the clock signal.

For example, if a correlation level is obtained which corresponds to the first correlation value of 0.25 (the second correlation value of 0), the frequency is set so as to maintain the phase because the carrier signal is in sync with the clock signal. For example, when the bit rate as the frequency is 10 Mbps, the bit rate is maintained at 10 Mbps.

In contrast, if a correlation level is obtained which corresponds to the first correlation value of 0 (the second correlation value of 0.5), the value indicates that the carrier signal is out of sync with the clock signal. Therefore, if the phase is lagging, the frequency is set so as to advance the phase; if the phase is leading, the frequency is set so as to delay the phase.

For example, to advance the phase, the bit rate is increased to, for example, 11 Mbps when the bit rate as the frequency is 10 Mbps. The operation so far enables the acquisition and maintaining of synchronization between the carrier signal and the clock signal.

Hence, when the clock synchronization is acquired, the component code signal X is synchronized simultaneously with the acquisition. Therefore, after that, the synchronization point of the component code signal Y (or Z) is searched for while maintaining the carrier signal received by the reception section 1 in sync with the clock signal. Specifically, the phase control section 22 controls the phase according to the correlation level output from the first correlator 3A so as to synchronize the component code signal Y (or component code signal Z).

Now, the synchronization point of the component code signal Z (or component code signal Y) is searched for while maintaining the carrier signal in sync with the component code signal Y (or component code signal Z). The component code signal Z (or component code signal Y) is synchronized in the same manner as the component code signal Y is synchronized; details are not repeated. That synchronizes all the component code signals X, Y, and Z, which means that the multi-component code signal W is synchronized. In that case, the synchronization determining section 6 in the code synchronization circuit 10 determines that the multi-component code signal W is in sync the carrier signal.

The role of the delayed component code signal x will be described in reference to FIG. 5, (a) of FIG. 6, and (b) of FIG. 6. FIG. 5 is a correlation matrix for the multi-component code signal W and the component code signal X which is a code signal ("CL/2" in (a) of FIG. 6) obtained by dividing the clock signal by 2. "CL/2" in the figure represents a half-rate clock signal.

If the correlation value is 0.5, it indicates that the clock signal contained in the incoming carrier signal and the internal clock signal are in sync. If the correlation value is −0.5, it indicates that the clock signal contained in the incoming carrier signal and the internal clock signal are in sync, but have opposite phases.

Figure 6:
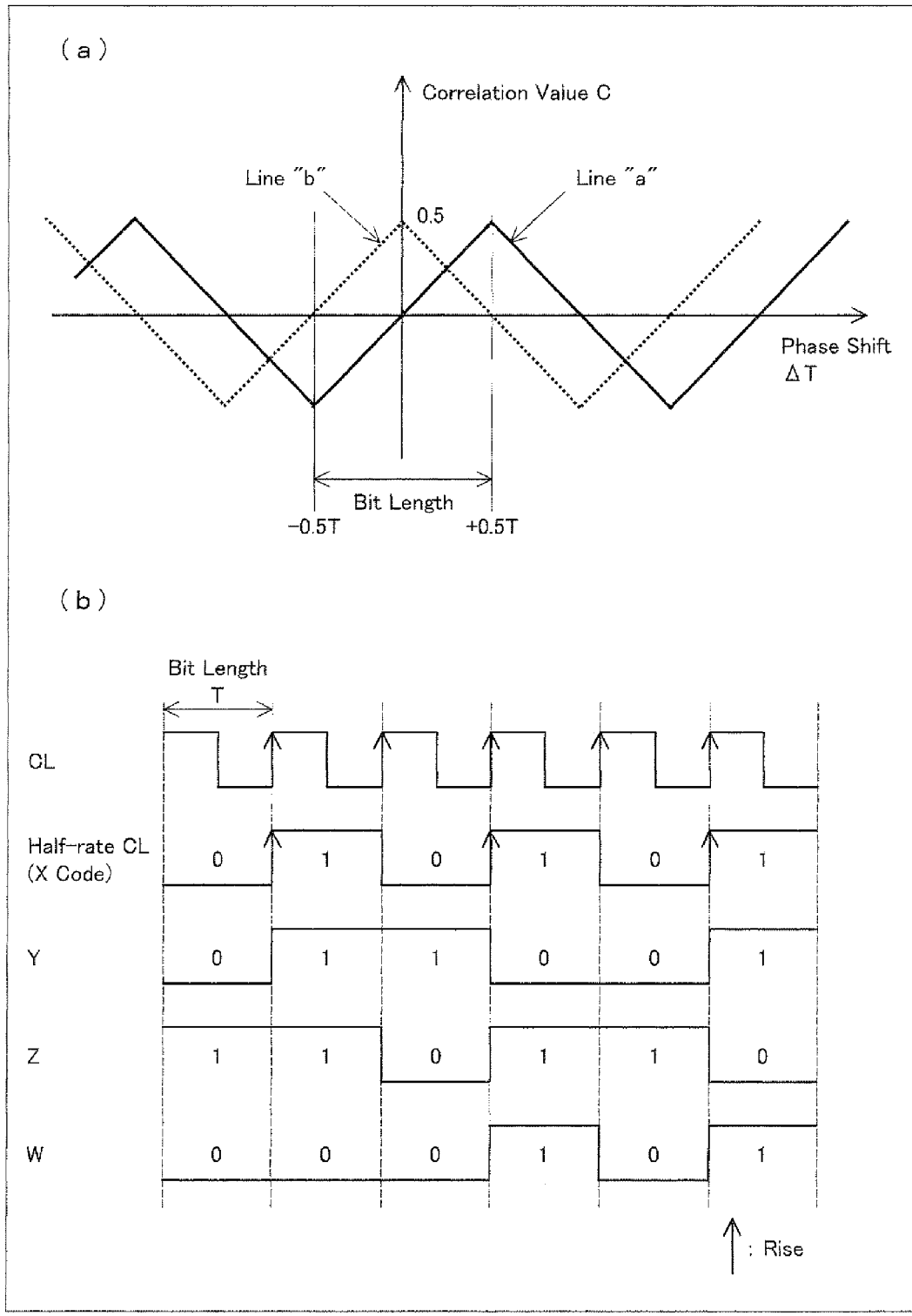
FIG. 6 is a schematic illustration of various input signals and a correlation property of output signals for a code synchronization circuit, (a) illustrating a relationship between correlation value outputs from two correlators and phase shifting of a clock signal in the code synchronization circuit and (b) illustrating a relationship between a clock signal, a half-rate clock signal (component code signal X), component code signals Y, Z, and a multi-component code signal W.
Figure 7:
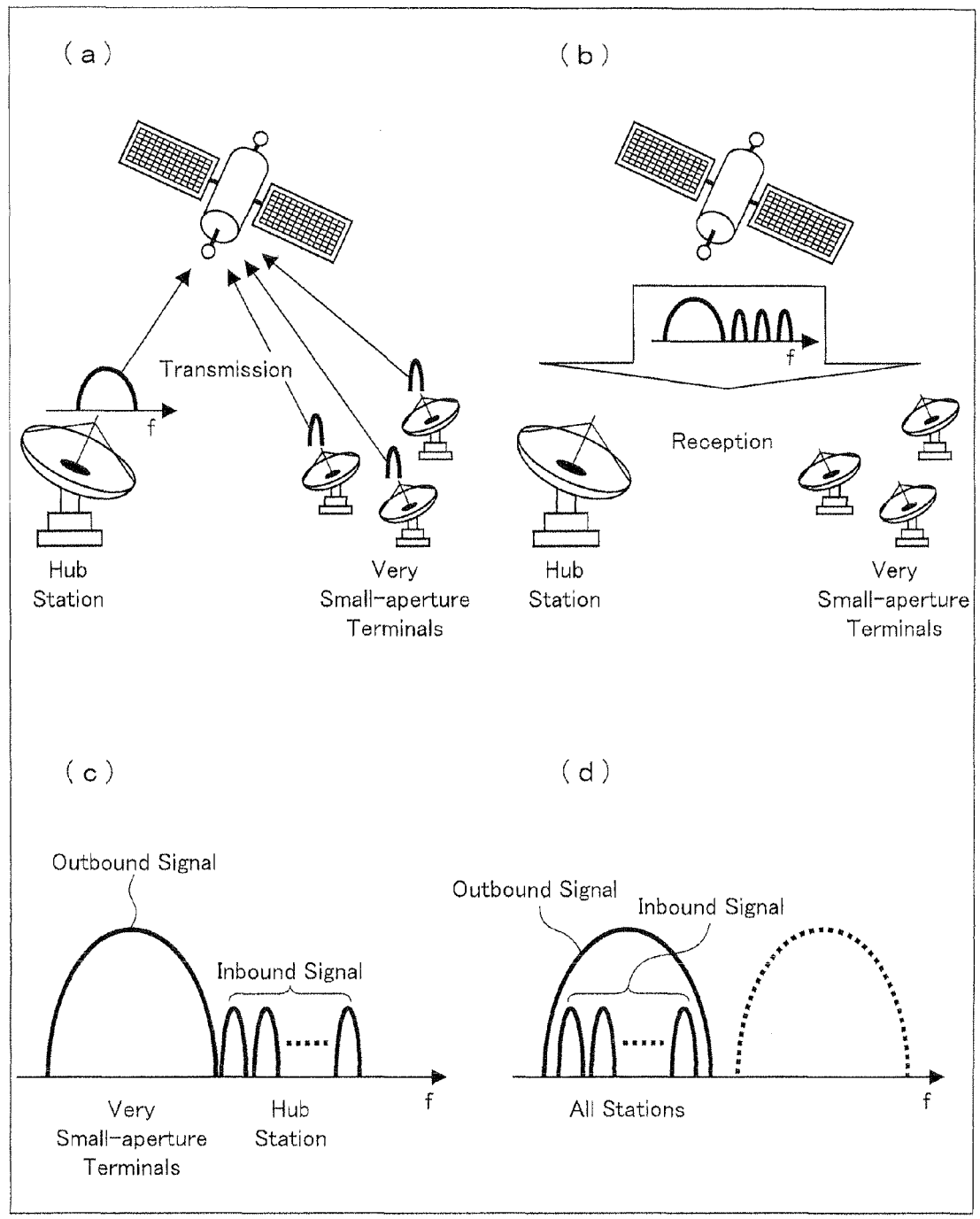
FIG. 7 is a schematic illustration of an overview of conventional communications systems, (a) depicting transmissions in frequency superimposition (b) depicting reception in frequency superimposition, (c) depicting carrier arrangement in a channel frequency band in conventional communications systems, and (d) depicting carrier arrangement in a channel frequency band in carrier superimposition.

The correlation value corresponding to the correlation level output from the first correlator 3A and the second correlator 3B according to these characteristics is shown in (a) of FIG. 6 as a function of a phase shift ΔT. (a) of FIG. 6 shows two lines "a" and "b."

The line "a" represents a correlation property of the delayed component code signal x and the carrier signal and corresponds to the correlation value for the second correlator 3B. On the other hand, the line "b" represents a correlation property of the component code signal X and the carrier signal and corresponds to the correlation value for the first correlator 3A.

For the correlation property represented by the line "a," the second correlation value is a maximum at 0.5 when the phase shift ΔT is 0.5 T (T is a clock cycle), and the second correlation value is also 0 when the phase shift ΔT is 0. Meanwhile, for the correlation property represented by the line "b," the third correlation value is a maximum at 0.5 when the phase shift ΔT is 0, and the third correlation value is 0 when the phase shift ΔT is 0.5 T.

The loop made up of the second correlator 3B, the numeric control frequency variable oscillation section 5, the 2-divider 23, and the ½ delay device 4 forms a circuit called a phase-locked loop. It is known that the correlation property like the one represented by the line "a" is essential to acquire clock synchronization in the phase-locked loop. In other words, a feedback is needed with such a point that the second correlation value is 0 when the phase shift ΔT is 0 being designated as a synchronization point. The line "a" is symmetrical with respect to the origin and looks like the figure S. It is given a special name "S curve."

Next will be described a relationship between the clock signal, the half-rate clock signal (component code signal X), the component code signals Y and Z, and the multi-component code signal W in reference to (b) of FIG. 6. "CL" is a clock signal. "Half-rate CL (X code)" is a code signal obtained by dividing the clock signal by 2, that is, the component code signal X with a 2 bit cycle. "Y," "Z," and "W" are respectively the component code signals Y and Z and the multi-component code signal W.

One cycle of the clock signal corresponds to 1 bit because one code is generated in one cycle of the clock signal.

(b) of FIG. 6 illustrates the component code signals X, Y, and Z and the multi-component code signal W being generated in sync with the rises of the clock signal. The relationship between the multi-component code signal W and the component code signals X, Y, and Z is the same as was described under "4. Correlation Property of Multi-component Code Signal."

As detailed above, the code synchronization circuit 10 designates a half-rate clock signal as the shortest cycle component code signal X and uses the component code signal X in synchronizing a common clock signal for the component code signal X as the component code signals Y and Z (component code signals except for the component code signal X) and the carrier signal. Therefore, the synchronization between the carrier signal and the clock signal is acquired at the same time as the synchronization between the carrier signal and the component code signal X is acquired.

In addition, by using the second correlation value which is an index of similarity between the carrier signal and the delayed component code signal x obtained by delaying the phase of the component code signal X by ½ bit, the point at which the phase shift (phase error) of the clock signal is 0 when the second correlation value is 0 is made to match the synchronization point of the carrier signal and the clock signal.

It is hence possible to form a loop called a phase-locked loop from the second correlator 3B, the numeric control frequency variable oscillation section 5, the 2-divider 23, and the T/2 delay device as mentioned above.

As described in the foregoing, small variations in the input level of the incoming carrier signal do not produce large effect on stable acquisition of synchronization between the clock signal and the carrier signal because the synchronization point of the carrier signal and the clock signal is designed close to a point where the second correlation value is 0 and the clock signal has a phase shift ΔT=0. Therefore, the resultant code synchronization circuit, even when used in a low C/N environment, is capable of high precision timing phase measurement and stable operation against variations in the reception level.

8. Code Synchronization Circuit

Example, 2

Figure 2:
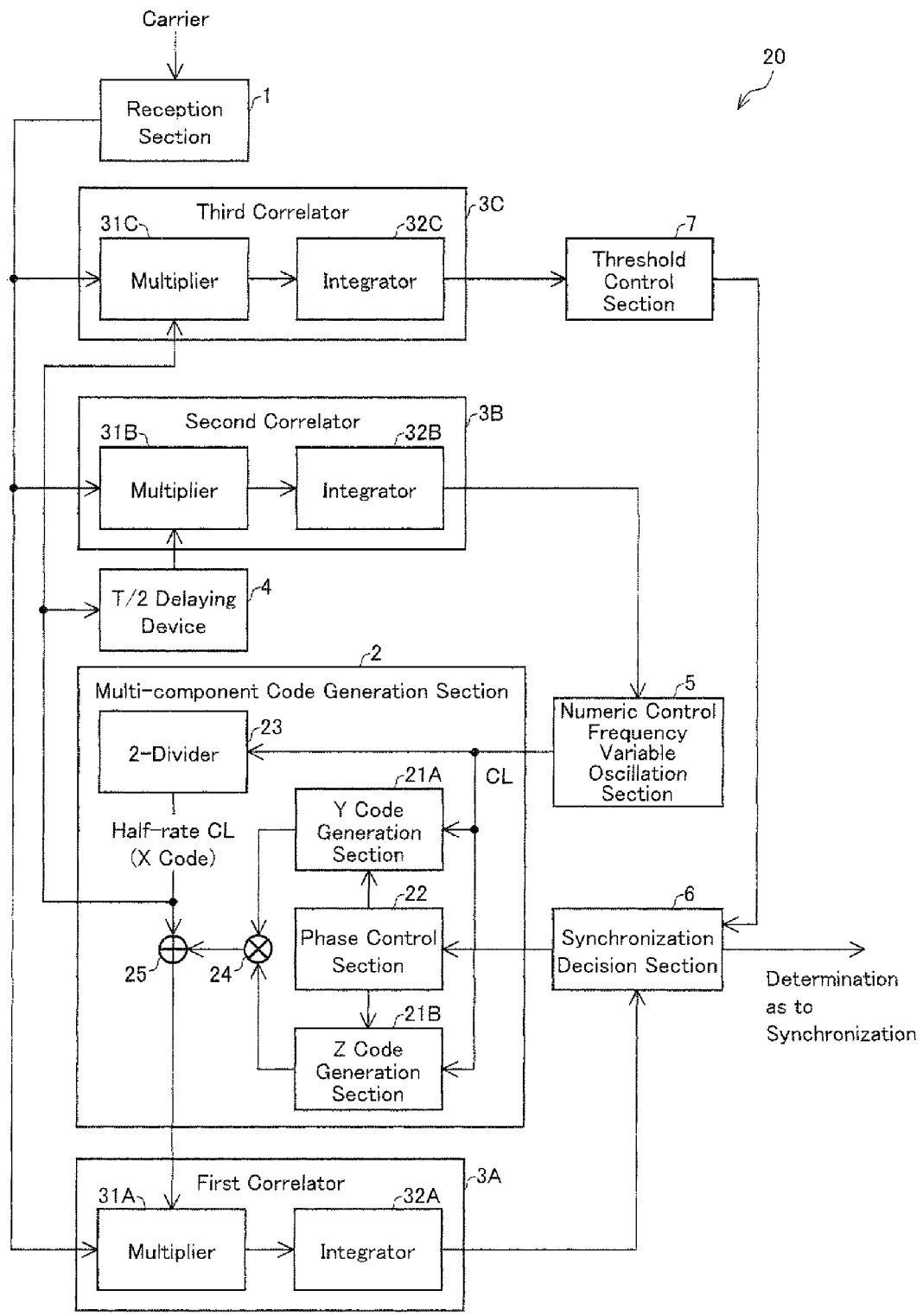
FIG. 2 is a functional block diagram of another exemplary code synchronization circuit in accordance with the present invention.

The following will describe a code synchronization circuit 20 which is another exemplary code synchronization circuit in accordance with the present invention in reference to FIGS. 2 and 17. The code synchronization circuit in example 2 has the same structure as the code synchronization circuit in example 1 unless otherwise noted. In addition, for convenience, the members of the present embodiment that have the same function as the members illustrated in the figures of the code synchronization circuit in example 1 are indicated by the same reference numerals and description thereof is omitted.

FIG. 2 is a functional block diagram of the structure of the code synchronization circuit 20 which differs from the code synchronization circuit 10 only in that the circuit 20 further includes a third correlator (third correlation value output means) 3C and a threshold control section (threshold control means) 7.

The third correlator 3C outputs a correlation level corresponding to the third correlation value which is an index of similarity between the carrier signal received by the reception section 1 and the component code signal X obtained by dividing by 2 the clock signal generated by the 2-divider 23. The third correlator 3C includes a multiplier 31C and an integrator 32C. The multiplier 31C multiplies the carrier signal by the component code signal X. The integrator 32C sums the results of the computation by the multiplier 31C for integration. The summing is done by exclusive OR operation.

The threshold control section 7 adjusts the threshold predetermined by the synchronization determining section 6 according to the correlation level output from the third correlator 3C. For example, when there are correlation levels corresponding to four correlation values 0, 0.25, 0.5, and 1 as exemplified earlier in FIG. 17, for example, three thresholds T1=0.125, T2=0.375, and T3=0.75 are predetermined.

When the carrier signal and the component code signal X are in sync in the code synchronization circuit 20, the theoretical correlation value output from the first correlator 3A is 0.25. The correlation level corresponding to this correlation value 0.25 can vary with variations in the input level. However, the thresholds T2 and T3 can be corrected using the output from the third correlator 3C after a sufficient time is allocated for the integration in the first correlator 3A for averaging.

For example, when the correlation level output from the third correlator 3C is greater than a reference correlation level (for example, when the correlation value is designated as the reference value), the thresholds T2 and T3 are increased. On the other hand, when the correlation level output from the third correlator 3C is less than the reference correlation level, the thresholds T2 and T3 are decreased.

The operation so far, in conjunction with the structure of the code synchronization circuit 10, further enables adjustment of the threshold for making a decision as to synchronization according to variations in the reception level of the incoming signal. Thus, for example, the resultant code synchronization circuit, even when used in a low C/N environment, is capable of high precision timing phase measurement and stable operation against variations in the reception level.

9. Code Synchronization Circuit

Example 3

Figure 3:
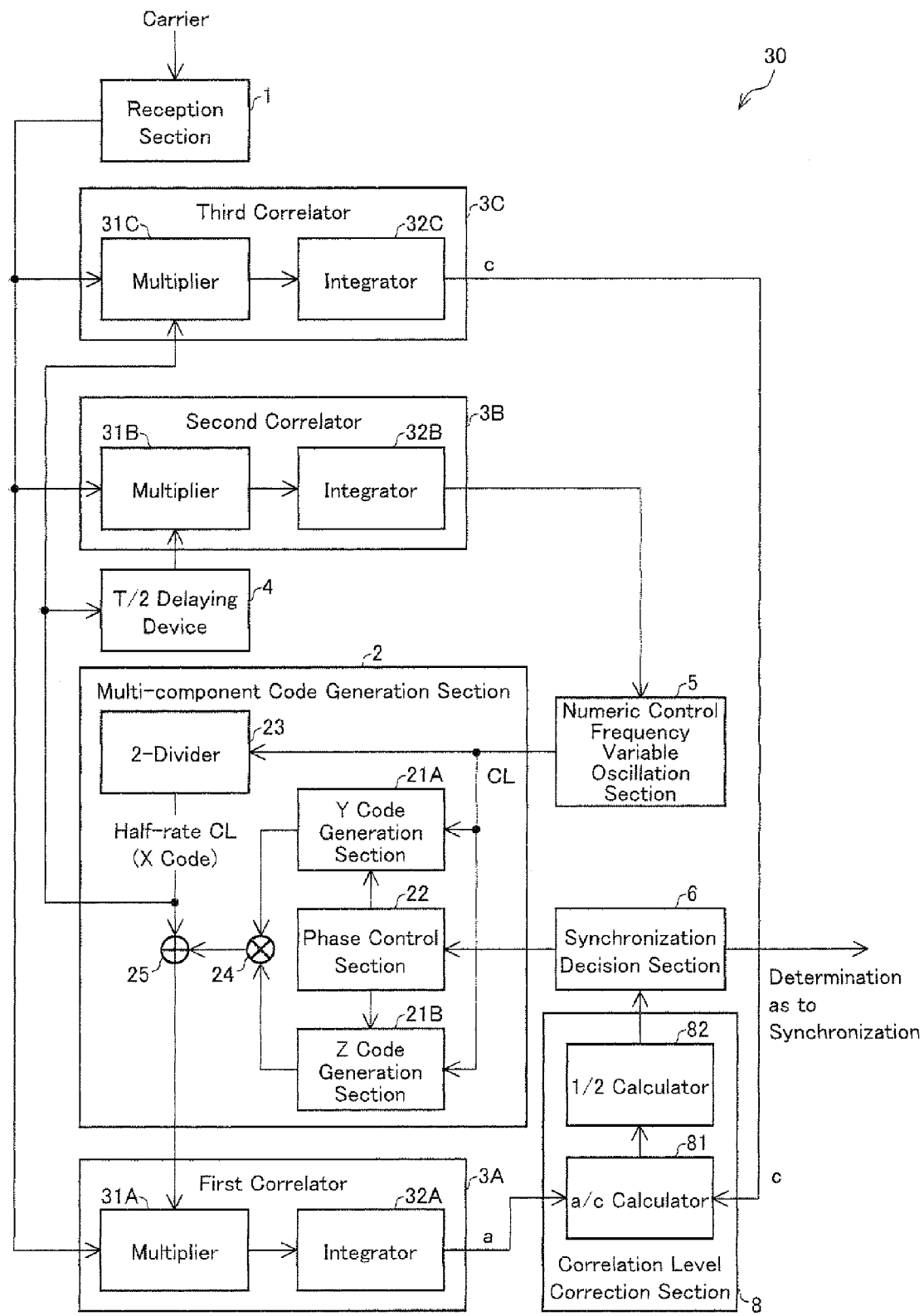
FIG. 3 is a functional block diagram of yet another exemplary code synchronization circuit in accordance with the present invention.

The following will describe a code synchronization circuit 30 which is a further exemplary code synchronization circuit in accordance with the present invention in reference to FIG. 3. The code synchronization circuit in example 3 has the same structure as the code synchronization circuit in example 1 or 2 unless otherwise noted. In addition, for convenience, the members of the present embodiment that have the same function as the members illustrated in the figures of the code synchronization circuit in example 1 or 2 are indicated by the same reference numerals and description thereof is omitted.

FIG. 3 is a functional block diagram of the structure of the code synchronization circuit 30 which differs from the code synchronization circuit 10 only in that the circuit 30 further includes a third correlator 3C and a correlation level correction section (level correction means) 8. The circuit 30 differs from the code synchronization circuit 20 only in that the circuit 30 includes the correlation level correction section 8 in place of the threshold control section 7.

The correlation level correction section 8 adjusts the correlation level output from the first correlator 3A according to variations in the correlation level output from the third correlator 3C. The section 8 includes an a/c calculator 81 and a ½ calculator 82.

The a/c calculator 81 calculates the ratio (a/c) of the correlation level output from the first correlator 3A (real number "a") to the correlation level output from the third correlator 3C (real number "c"). The ½ calculator 82 is a calculator reducing the value of a/c by half.

The correlation level may be corrected for variations caused by the variations in the reception level, for example, by maintaining the correlation level for the first correlation value at the first theoretical correlation value as in the following.

First, when the carrier signal and the clock signal are in sync, the theoretical correlation value output from the first correlator 3A is 0.25. The correlation level corresponding to this correlation value ("a" in FIG. 3) is proportional to the reception level. Taking a proportional constant k (k is a real number), the theoretical correlation value is given as 0.25 k. Meanwhile, the theoretical correlation value output from the third correlator 3C is 0.5. The correlation level corresponding to this correlation value ("c" in FIG. 3) is proportional to the reception level, or given as 0.5 k.

By calculating a ratio (a/c) of these theoretical correlation values, the proportional constant k related to the reception level is cancelled. The ratio is output from the a/c calculator 81: a/c=0.25 k/0.5 k=0.25/0.5=0.5.

The value 0.5 is twice the first theoretical correlation value 0.25.

The ½ calculator 82 gives (a/c)·(½)=0.5·(½)=0.25. This method allows the correlation level input to the synchronization determining section 6 to be the first theoretical correlation value.

Another feasible method is to increase the correlation level output from the first correlator 3A when the correlation level output from the third correlator 3C is greater than a reference correlation level (for example, where the correlation value is designated as the reference value) and to decreased the correlation level output from the first correlator 3A when the correlation level output from the third correlator 3C is less than the reference correlation level.

The operation so far, in conjunction with the aforementioned structure, further enables adjustment of the correlation level for making a decision as to synchronization according to variations in the reception level of the incoming signal.

Thus, for example, the resultant code synchronization circuit, even when used in a low C/N environment, is capable of high precision timing phase measurement and stable operation against variations in the reception level.

10. Example of Delay Time Measurement Device

Figure 4:
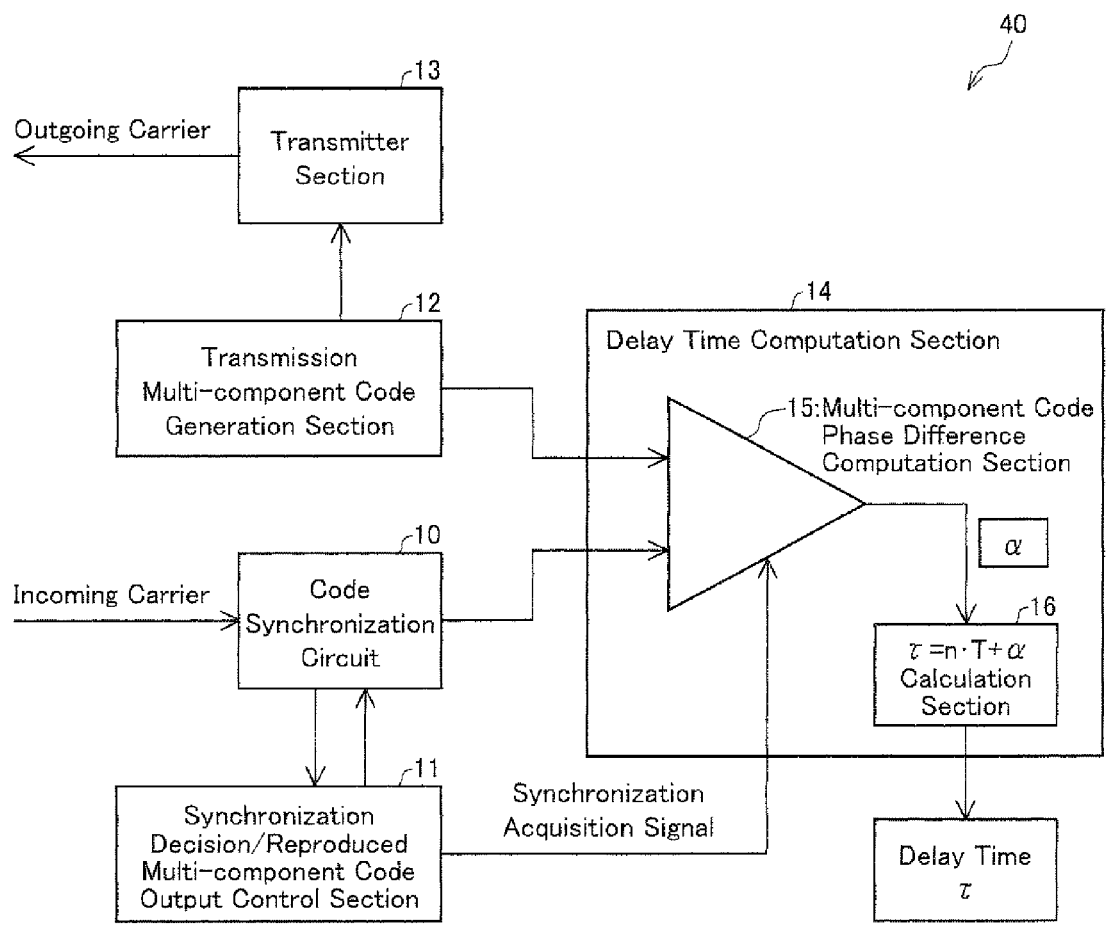
FIG. 4 is a functional block diagram of an exemplary delay time measurement device in accordance with the present invention.

The following will describe a delay time measurement device 40 which is an exemplary delay time measurement device in accordance with the present invention in reference to FIG. 4. The delay time measurement device in this example has the same structure as the code synchronization circuit in examples 1 to 3 unless otherwise noted. In addition, for convenience, the members of the present embodiment that have the same function as the members illustrated in the figures of the code synchronization circuit in examples 1 to 3 are indicated by the same reference numerals and description thereof is omitted.

FIG. 4 is a functional block diagram of the structure of the delay time measurement device 40 in accordance with this embodiment. Referring to FIG. 4, the device 40 includes a code synchronization circuit 10, a synchronization determining/reproduced multi-component code output control section (multi-component code signal reproduction means) 11, a transmission multi-component code generation section (transmission multi-component code signal generation means) 12, a transmission section (transmission means) 13, and a delay time calculation section (delay time calculation means) 14.

FIG. 4 illustrates the device 40 including the code synchronization circuit 10 as an example. This is not the only possibility. The device 40 may include a code synchronization circuit 20, a code synchronization circuit 30, or any other code synchronization circuit capable of handling a multi-component code signal. In the following, the description "code synchronization circuit 10 to 30" indicates that any one of the code synchronization circuits 10 to 30 is used.

The synchronization determining/reproduced multi-component code output control section 11 sends a multi-component code signal reproduced from the carrier signal to the delay time calculation section 14 when synchronization is acquired between the carrier signal and the multi-component code signal in the code synchronization circuit 10 to 30.

The transmission multi-component code generation section 12 generates a transmission multi-component code signal having the same characteristics as the multi-component code signal generated by the code synchronization circuit 10 to 30 and transmits the generated multi-component code signal to the transmission section 13 and the delay time calculation section 14. The transmission section 13 externally transmits a carrier signal obtained by modulating a carrier (carrier wave) with the transmission multi-component code signal.

The delay time calculation section 14 includes a multi-component code phase difference computation section 15 and a τ=n·T+α calculation section 16.

The multi-component code phase difference computation section 15 calculates a real number α (0≦α<1), which is a delay time of the multi-component code signal per frame, from a phase difference per frame between the transmission multi-component code signal and the reproduction multi-component code signal.

The delay time τ is defined as the time from when the transmission section 13 transmits the carrier signal to when the reception section 1 in the code synchronization circuit 10 to 30 in FIG. 1 receives the carrier signal carrying the transmission multi-component code signal. Letting a real constant T represent the common cycle of the multi-component code signal and the transmission multi-component code signal, n is defined as an integer satisfying the inequality:

$$n \cdot T \leq \tau < (n+1) \cdot T \quad (2)$$

The τ=n·T+α calculation section 16 calculates the delay time τ from the equation:

$$\tau = n \cdot T + \alpha \quad (3)$$

Next, the operation of the delay time measurement device 40 will be described in reference to FIG. 4. First, the transmission multi-component code generation section 12 generates the transmission multi-component code signal and sends it to the transmission section 13 where the carrier (communications carrier wave) is modulated with the transmission multi-component code signal and externally transmitted as the carrier signal. The carrier signal is received by a geostationary satellite around the earth and sent back from the geostationary satellite to the delay time measurement device 40.

The code synchronization circuit 10 to 30 in the delay time measurement device 40 acquires synchronization between the incoming carrier signal and the multi-component code signal generated in the code synchronization circuit 10 to 30. When synchronization is acquired between all the component code signals making up the multi-component code signal and the carrier signal, the code synchronization circuit 10 to 30 determines that multi-component code signal W is in sync and notifies the synchronization determining/reproduced multi-component code output control section 11 of it.

The synchronization determining/reproduced multi-component code output control section 11, upon receiving the notification, instructs the code synchronization circuit 10 to 30 to send to the delay time calculation section 14 the multi-component code signal (reproduction multi-component code signal) which is now in sync with the carrier signal generated by the code synchronization circuit 10 to 30 and transmits to the delay time calculation section 14 a synchronization acquisition signal by which the delay time calculation section 14 is notified of the acquisition of the synchronization.

Upon receiving the synchronization acquisition signal from the synchronization determining/reproduced multi-component code output control section 11, the delay time calculation section 14 calculates the delay time τ for output as mentioned earlier.

The inclusion of the code synchronization circuit 10 to 30 in the delay time measurement device 40, as detailed above, stabilizes the acquisition of synchronization between the carrier signal and the multi-component code signal in the delay time measurement device 40. The use of the delay time measurement device 40 in delay time measurement enables the reproduction of synchronization timing in the 750 kHz bandwidth with such precision that the phase is less than or equal to 5°.

Thus, for example, the resultant delay time measurement device, even when used in a low C/N environment, is capable of high precision timing phase measurement and stable operation against variations in the reception level.

11. Conclusion

A. A delay time measurement code signal was chosen in the present embodiment for replica signal generation in frequency superimposition in satellite communications. A multi-component code signal W composed of the following component code signals X, Y, and Z was chosen as the delay time measurement code signal. The component code signals X, Y, Z were respectively a code signal (cycle=2) obtained by dividing a clock signal by 2, an M sequence code signal (cycle=63), and an M sequence code signal (cycle=127).

B. The characteristics of an unwanted carrier canceller varied greatly depending on the characteristics of a delay time measurement device. The delay time measurement device 40 was provided as an embodiment of the delay time measurement device.

C. An accurate, stably operational code synchronization circuit was designed. The cycles of the component code signals, the integration time in a correlator, and other parameters that were important to circuit design were given as an example.

D. It was learned that the component code signals needed to be chosen carefully where the auto-correlation property could vary with the phase difference between the component codes, for example, when a random sequence was used.

The embodiment and examples describing the exemplary code synchronization circuits and delay time measurement device are for illustrative purposes only and by no means limit the scope of the present invention. Variations are not to be regarded as a departure from the spirit and scope of the invention, and all such modifications as would be obvious to one skilled in the art are intended to be included within the scope of the claims.

Finally, the blocks of the code synchronization circuits 10 to 30 and the delay time measurement device 40 may be implemented by hardware or software executed by a CPU as follows:

The code synchronization circuits 10 to 30 and the delay time measurement device 40 each include a CPU (central processing unit) and memory devices (storage media). The CPU executes instructions contained in control programs, realizing various functions. The memory devices may be a ROM (read-only memory) containing programs, a RAM (random access memory) to which the programs are loaded, or a memory containing the programs and various data. The objective of the present invention can be achieved also by mounting to the code synchronization circuits 10 to 30 and the delay time measurement device 40 a computer-readable storage medium containing control program code (executable programs, intermediate code programs, or source programs) which is software realizing the aforementioned functions, in order for a computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disc, such as CD-ROM/MO/MD/DVD/CD-R; a card, such as an IC card (memory card) or an optical card; or a semiconductor memory, such as a mask ROM/EPROM/EEPROM/flash ROM.

The code synchronization circuits 10 to 30 and the delay time measurement device 40 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, a wired line, such as IEEE 1394, USB, an electric power line, a cable TV line, a telephone line, or an ADSL; or wireless, such as infrared (IrDA, remote control), Bluetooth®, 802.11 wireless, HDR, a mobile telephone network, a satellite line, or a terrestrial digital network. The present invention encompasses a carrier wave, or data signal transmission, in which the program code is embodied electronically.

The code synchronization circuit according to the present invention preferably includes the structure and is also such that the component code signals other than the minimum cycle component code signal are M sequence code signals.

According to the structure, the M sequence code signal has a stable auto-correlation property even if the M sequence code signal has a relatively short cycle when compared with that of a "random sequence code signal" which requires a very long cycle to achieve a stable auto-correlation property.

The "auto-correlation property" is the property of a correlation value which indicates similarity between a particular code signal and a code signal.

The code synchronization circuit according to the present invention preferably includes the structure and further includes multi-component code signal generation means for generating a multi-component code signal W from three component code signals X, Y, and Z having cycles which, given as integral multiples of one bit length, are relatively prime, wherein: the component code signal X is the minimum cycle component code signal; and the multi-component code signal W is generated using computation means for implementing a computation process based on an equation:

Math 4

$$W = X \oplus (Y \cdot Z) \quad (1)$$

where $$\oplus \quad \text{Math 3}$$

represents an exclusive OR.

According to the structure, the multi-component code signal W is generated from the three component code signals X, Y, and Z having cycles which, given as integral multiples of one bit length, are relatively prime. The component code signal X is designated as the minimum cycle component code signal. The multi-component code signal is generated by a computation process based on equation (1).

The number of phase shifts for the acquiring of synchronization of the multi-component code signal is equal to the sum of the numbers of phase shifts for the acquiring of synchronization of each of the component code signals X, Y, and Z due to the multiplicity of the auto-correlation value of the multi-component code signal W. The number of phase shifts required to synchronize the carrier signal with all the component code signals X, Y and Z is greatly lowered when compared with cases where a "single PN code (pseudo noise code)" which has the same cycle as the multi-component code signal W is used.

A delay time measurement device according to the present invention preferably includes: the code synchronization circuit; multi-component code signal reproduction means for generating a reproduction multi-component code signal which is a multi-component code signal composed of component code signals all of which are determined by the code synchronization determining means in the code synchronization circuit to be in sync with the carrier signal; transmission multi-component code signal generation means for generating the component code signals to generate a transmission multi-component code signal from the component code signals; transmission means for transmitting a carrier signal to which the transmission multi-component code signal is added; and delay time calculation means for calculating, from a phase difference between the reproduction multi-component code signal and the transmission multi-component code signal, a which is a real number parameter with a dimension of time and in a range of $0 \leq \alpha < 1$ to calculate a delay timer from an equation:

$$\tau = n \cdot T + \alpha \quad (3)$$

where τ is a delay time from when the transmission means transmits the carrier signal to which the transmission multi-component code signal is added to when the reception means receives the carrier signal to which the transmission multi-component code signal is added, T is a real constant common cycle of the multi-component code signal and the transmission multi-component code signal, and n is an integer meeting an inequality:

$$n \cdot T \leq \tau < (n+1) \cdot T \quad (2).$$

According to the structure, the code synchronization is performed by the code synchronization circuit. The delay time τ is calculated from equation (3) when the delay time τ meets inequality (2).

Therefore, the phase needs to be shifted by no greater than a cycle of the multi-component code signal to calculate the delay time τ. The measurement of the delay timer τ takes much less time.

The code synchronization circuit and the delay time measurement device may be implemented on a computer. When that is the case, the scope of the present invention encompasses control programs for the code synchronization circuit and the delay time measurement device, which when run on a computer causes the computer to function as those means to implement the code synchronization circuit and the delay time measurement device and also encompasses computer-readable storage media containing such a program.

INDUSTRIAL APPLICABILITY

The present invention provides a code synchronization circuit and a delay time measurement device applicable to delay time measurement needed for the generation of a replica signal of an unwanted carrier in, for example, a VSAT satellite communications network where frequency superimposition is used.

The invention claimed is:

1. A code synchronization circuit, comprising:
reception means for receiving an external carrier signal;
variable oscillation means for generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime;
a plurality of component code signal generation means for generating the component code signals other than the minimum cycle component code signal when the clock signal is input;
first correlation value output means for outputting a first correlation value indicating similarity between the carrier signal and each of the component code signals;
code phase control means for controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal;
code synchronization determining means for deter lining whether each of the component code signals is in sync with the carrier signal based on the first correlation value;
frequency dividing means for dividing the clock signal by 2 to generate the minimum cycle component code signal;

delay means for outputting a delayed minimum cycle component code signal lagging in phase behind the minimum cycle component code signal by half a bit; and second correlation value output means for outputting a second correlation value indicating similarity between the delayed minimum cycle component code signal and the carrier signal, wherein the variable oscillation means controls the frequency of the clock signal according to the second correlation value so that the carrier signal and the clock signal are in sync.

2. A code synchronization circuit, comprising:

reception means for receiving an external carrier signal;

variable oscillation means for generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime;

a plurality of component code signal generation means for generating the component code signals other than the minimum cycle component code signal when the clock signal is input;

first correlation value output means for outputting a first correlation value indicating similarity between the carrier signal and each of the component code signals;

code phase control means for controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal;

code synchronization determining means for determining that when the first correlation value exceeds synchronization determining each threshold specified according to a number of component code signals which are in sync with the carrier signal, a number of component code signals are in sync, the latter number corresponding to the former number;

frequency dividing means for dividing the clock signal by 2 to generate the minimum cycle component code signal;

second correlation value output means for outputting a second correlation value indicating similarity between the carrier signal and the minimum cycle component code signal; and threshold control means for changing the synchronization determining the threshold according to the second correlation value.

3. A code synchronization circuit, comprising:

reception means for receiving an external carrier signal;

variable oscillation means for generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime;

a plurality of component code signal generation means for generating the component code signals other than the minimum cycle component code signal when the clock signal is input;

first correlation value output means for outputting a first correlation value indicating similarity between the carrier signal and each of the component code signals;

code phase control means for controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal;

code synchronization determining means for determining that when the first correlation value exceeds synchronization determining each threshold specified according to a number of component code signals which are in sync with the carrier signal, a number of component code signals are in sync, the latter number corresponding to the former number;

frequency dividing means for dividing the clock signal by 2 to generate the minimum cycle component code signal;

second correlation value output means for outputting a second correlation value indicating similarity between the carrier signal and the minimum cycle component code signal; and level correction means for correcting a level of the first correlation value according to a level of the second correlation value.

4. The code synchronization circuit as set forth in claim 1, wherein the component code signals other than the minimum cycle component code signal are M sequence code signals.

5. The code synchronization circuit as set forth in claim 1, further comprising multi-component code signal generation means for generating a multi-component code signal W from three component code signals X, Y, and Z having cycles which, given as integral multiples of one bit length, are relatively prime, wherein:

the component code signal X is the minimum cycle component code signal; and the multi-component code signal W is generated using computation means for implementing a computation process based on an equation:

Math 2

$$W = X \oplus (Y \cdot Z) \qquad (1)$$

where $\oplus$ \hfill Math 1 represents an exclusive OR.

6. A delay time measurement device, comprising:

the code synchronization circuit as set forth in claim 1;

multi-component code signal reproduction means for generating a reproduction multi-component code signal which is a multi-component code signal composed of component code signals all of which are determined by the code synchronization determining means in the code synchronization circuit to be in sync with the carrier signal;

transmission multi-component code signal generation means for generating the component code signals to generate a transmission multi-component code signal from the component code signals;

transmission means for transmitting a carrier signal to which the transmission multi-component code signal is added; and delay time calculation means for calculating, from a phase difference between the reproduction multi-component code signal and the transmission multi-component code signal, a which is a real number parameter with a dimension of time and in a range of $0 \leq \alpha < 1$ to calculate a delay time τ from an equation:

$$\tau = n \cdot T + \alpha \qquad (3)$$

where τ is a delay time from when the transmission means transmits the carrier signal to which the transmission multi-component code signal is added to when the reception means receives the carrier signal to which the transmission multi-component code signal is added, T is a real constant common cycle of the multi-component code signal and the transmission multi-component code signal, and n is an integer meeting an inequality:

$$n \cdot T \leq \tau (n+1) \cdot T \qquad (2).$$

7. A method of controlling a code synchronization circuit, comprising the steps of:
   (a) receiving an external carrier signal;
   (b) generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime;
   (c) generating the component code signals other than the minimum cycle component code signal when the clock signal is input;
   (d) outputting a first correlation value indicating similarity between the carrier signal and each of the component code signals;
   (e) controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal;
   (f) determining whether each of the component code signals is in sync with the carrier signal based on the first correlation value;
   (g) dividing the clock signal by 2 to generate the minimum cycle component code signal;
   (h) outputting a delayed minimum cycle component code signal lagging in phase behind the minimum cycle component code signal by half a bit; and
   (i) outputting a second correlation value indicating similarity between the delayed minimum cycle component code signal and the carrier signal,
   wherein
   in step (b), the frequency of the clock signal is controlled according to the second correlation value so that the carrier signal and the clock signal are in sync.

8. A method of controlling a code synchronization circuit, comprising the steps of:
   (a) receiving an external carrier signal;
   (b) generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime;
   (c) generating the component code signals other than the minimum cycle component code signal when the clock signal is input;
   (d) outputting a first correlation value indicating similarity between the carrier signal and each of the component code signals;
   (e) controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal;
   (f) determining that when the first correlation value exceeds synchronization determining each threshold specified according to a number of component code signals which are in sync with the carrier signal, a number of component code signals are in sync, the latter number corresponding to the former number;
   (g) dividing the clock signal by 2 to generate the minimum cycle component code signal;
   (h) outputting a second correlation value indicating similarity between the carrier signal and the minimum cycle component code signal; and
   (i) changing the synchronization determining the threshold according to the second correlation value.

9. A method of controlling a code synchronization circuit, comprising the steps of:
   (a) receiving an external carrier signal;
   (b) generating a clock signal with a variable frequency for generation of component code signals other than a minimum cycle component code signal having a minimum cycle, all the component code signals, including the minimum cycle component code signal, being used to generate a multi-component code signal and having cycles which, given as integral multiples of one bit length, are relatively prime;
   (c) generating the component code signals other than the minimum cycle component code signal when the clock signal is input;
   (d) outputting a first correlation value indicating similarity between the carrier signal and each of the component code signals;
   (e) controlling, according to the first correlation value, phases of the component code signals, other than the minimum cycle component code signal, which are out of sync with the carrier signal so that each of the component code signals, other than the minimum cycle component code signal, which are out of sync with the carrier signal is in sync with the carrier signal;
   (f) determining that when the first correlation value exceeds synchronization determining each threshold specified according to a number of component code signals which are in sync with the carrier signal, a number of component code signals are in sync, the latter number corresponding to the former number;
   (g) dividing the clock signal by 2 to generate the minimum cycle component code signal;
   (h) outputting a second correlation value indicating similarity between the carrier signal and the minimum cycle component code signal; and
   (i) correcting a level of the first correlation value according to a level of the second correlation value.

10. A non-transitory computer-readable storage medium containing the control executable program for the method of controlling a code synchronization circuit as set forth in claim 7, the program causing a computer to carry out the individual steps in the method of controlling a code synchronization circuit.

11. A delay time measurement method comprising:
- the steps (a) through (i) in the method of controlling a code synchronization circuit as set forth in claim 7;
- (j) generating a reproduction multi-component code signal which is a multi-component code signal composed of component code signals all of which are determined in the step (f) to be in sync with the carrier signal;
- (k) generating the component code signals to generate a transmission multi-component code signal from the component code signals;
- (l) transmitting a carrier signal to which the transmission multi-component code signal is added; and
- (m) calculating, from a phase difference between the reproduction multi-component code signal and the transmission multi-component code signal, $\alpha$ which is a real number parameter with a dimension of time and in a range of $0 \leq \alpha < 1$ to calculate a delay time $\tau$ from an equation:

$$\tau = n \cdot T + \alpha \quad (3)$$

where $\tau$ is a delay time from when the carrier signal to which the transmission multi-component code signal is added is transmitted in the step (1) to when the carrier signal to which the transmission multi-component code signal is added is received in the step (a), T is a real constant common cycle of the multi-component code signal and the transmission multi-component code signal, and n is an integer meeting an inequality:

$$n \cdot T \leq \tau < (n+1) \cdot T \quad (2).$$

12. A non-transitory computer-readable storage medium containing the control executable program for the delay time measurement method as set forth in claim 11, the program causing a computer to carry out the individual steps in the delay time measurement method.

* * * * *